United States Patent
Matsumoto et al.

(10) Patent No.: US 6,862,067 B2
(45) Date of Patent: Mar. 1, 2005

(54) ACTIVE-MATRIX ADDRESSING LIQUID-CRYSTAL DISPLAY DEVICE USING LATERAL ELECTRIC FIELD AND HAVING TWO STORAGE CAPACITORS

(75) Inventors: Kimikazu Matsumoto, Tokyo (JP); Takahisa Hannuki, Tokyo (JP)

(73) Assignee: NEC LCD Technologies, Ltd., Kawasaki (JP)

( * ) Notice: Subject to any disclaimer, the term of this patent is extended or adjusted under 35 U.S.C. 154(b) by 0 days.

(21) Appl. No.: 10/338,826

(22) Filed: Jan. 9, 2003

(65) Prior Publication Data

US 2003/0128323 A1 Jul. 10, 2003

(30) Foreign Application Priority Data

Jan. 10, 2002 (JP) .................................... 2002-003005

(51) Int. Cl.[7] .......................................... G02F 1/1343
(52) U.S. Cl. ...................................... 349/141; 349/39
(58) Field of Search ................................ 349/39, 141

(56) References Cited

U.S. PATENT DOCUMENTS

| | | | | |
|---|---|---|---|---|
| 5,943,107 A | * | 8/1999 | Kadota et al. | 349/44 |
| 5,995,182 A | * | 11/1999 | Watanabe et al. | 349/110 |
| 6,094,250 A | * | 7/2000 | Choi et al. | 349/141 |
| 6,486,933 B1 | * | 11/2002 | Cha et al. | 349/139 |
| 2002/0131003 A1 | * | 9/2002 | Matsumoto | 349/139 |
| 2002/0159016 A1 | * | 10/2002 | Nishida et al. | 349/141 |

FOREIGN PATENT DOCUMENTS

| | | |
|---|---|---|
| JP | 06-202127 | 7/1994 |
| JP | 09-073101 | 3/1997 |
| JP | 10-026767 | 1/1998 |

* cited by examiner

Primary Examiner—Robert H. Kim
Assistant Examiner—Andrew Schechter
(74) Attorney, Agent, or Firm—McGinn & Gibb, PLLC

(57) ABSTRACT

An active-matrix addressing LCD device using lateral electric field realizes a higher transmittance and a higher fabrication yield and improves the aperture ratio without raising the fabrication cost. A first one of the common electrode lines, a first one of the pixel potential layers, and an intervening dielectric layer constitute a first storage capacitor for each of the pixels and at the same time, a second one of the common electrode lines, a second one of the pixel potential layers, and the intervening dielectric layer constitute a second storage capacitor for the same pixel. The first and second pixel potential layers are electrically connected to each other by way of a corresponding transparent pixel electrode. Therefore, the rotation of the liquid crystal molecules caused by applied electric field makes full contribution to the panel transmittance, preventing the obtainable total panel transmittance from lowering. This means that a higher transmittance is obtainable. An interconnection electrode may be additionally provided for the same purpose.

27 Claims, 22 Drawing Sheets

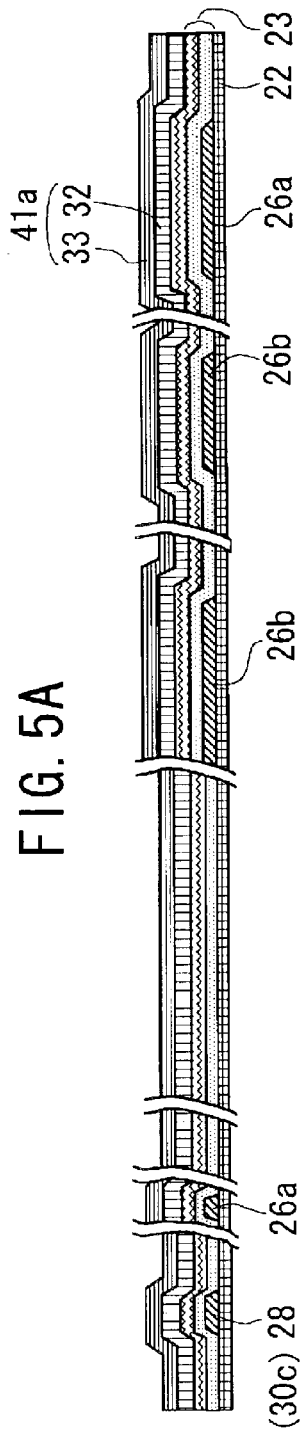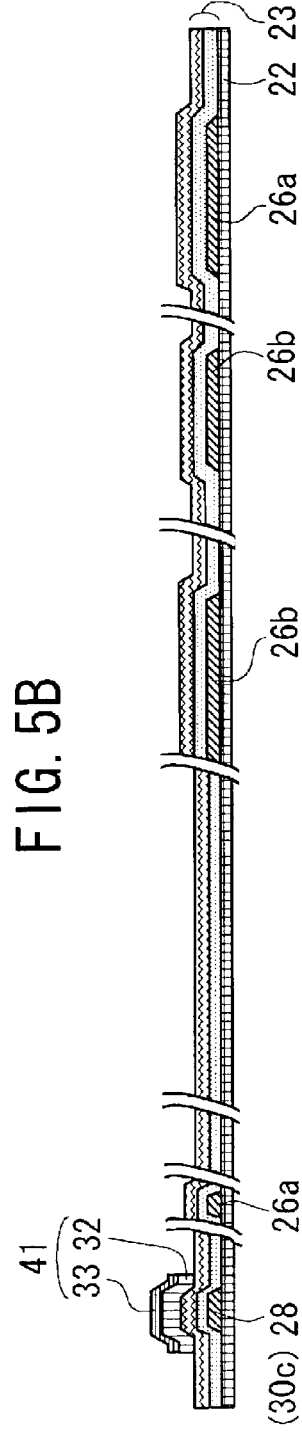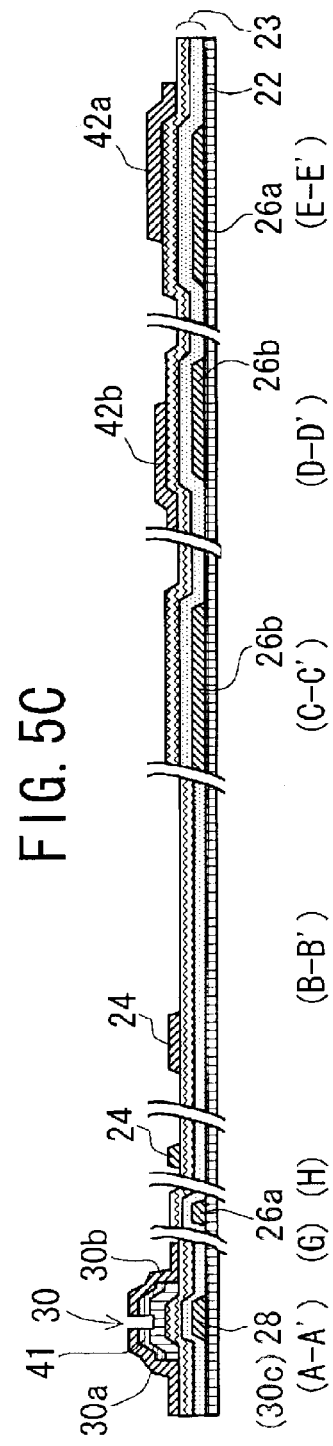

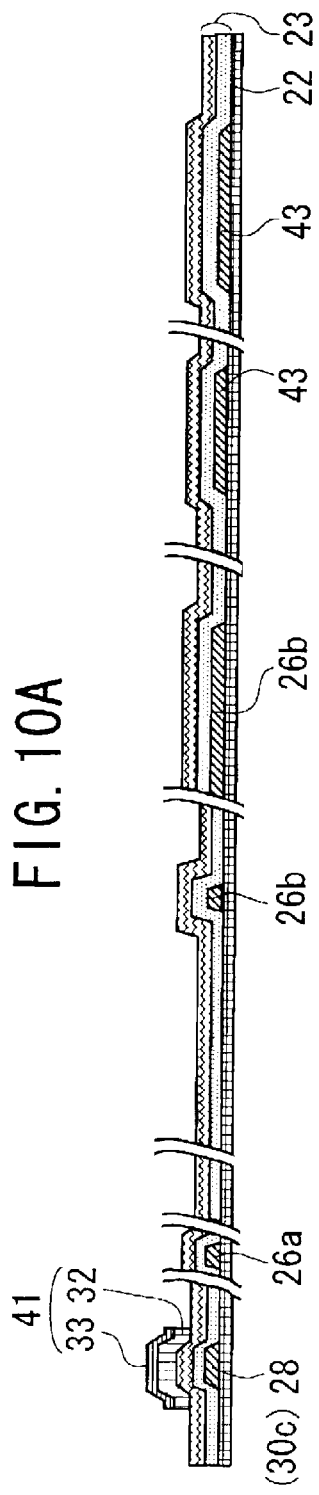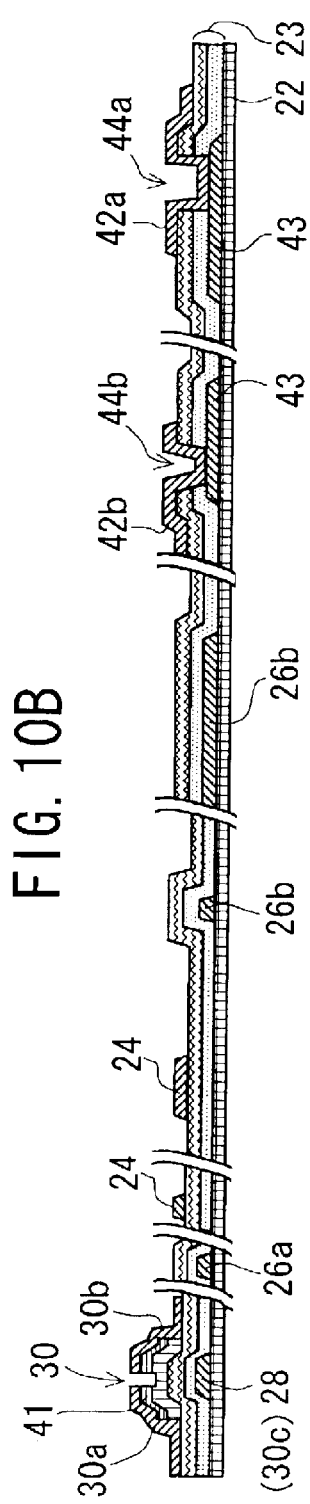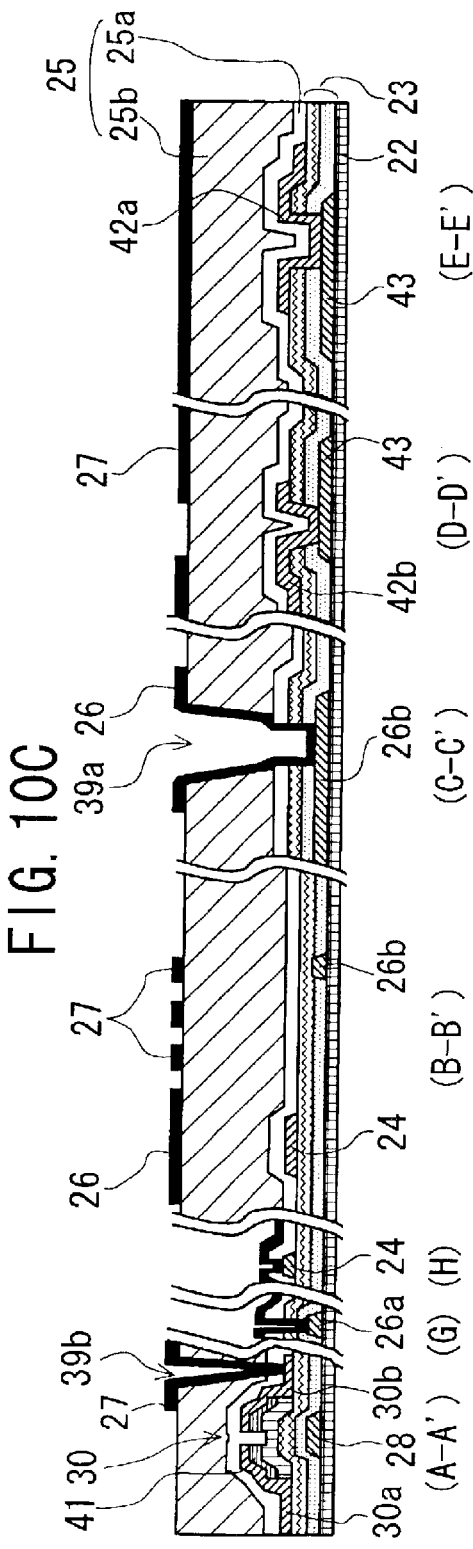

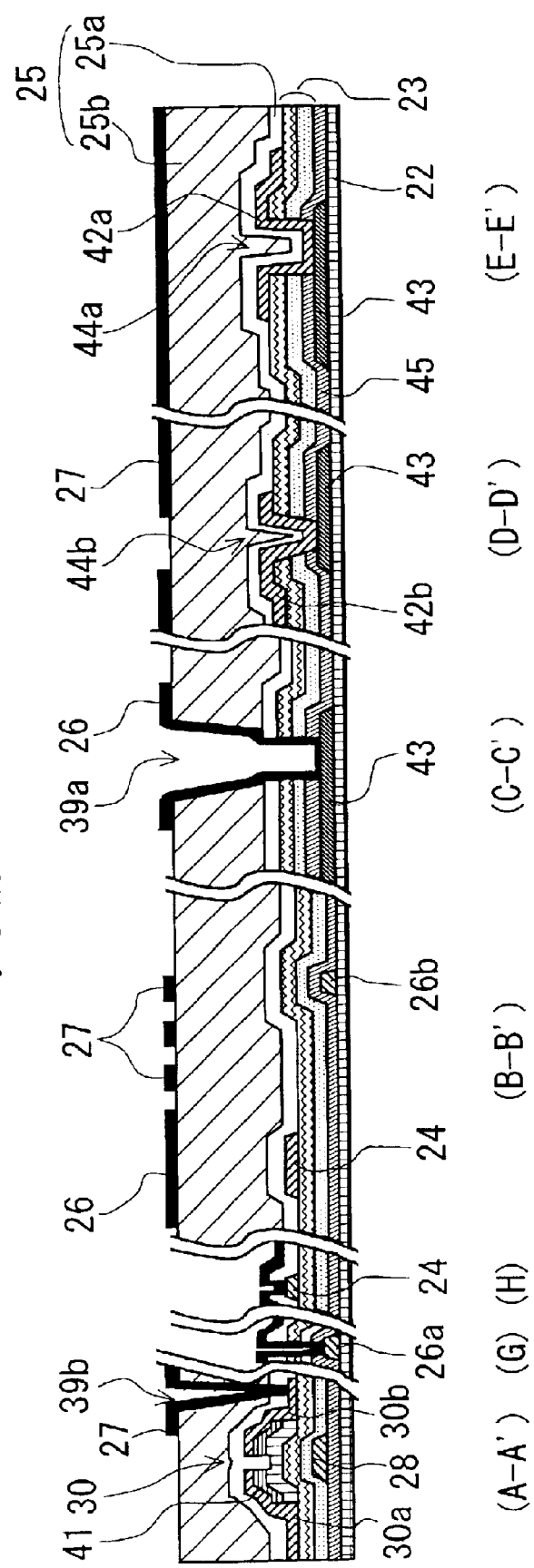

ACTIVE-MATRIX ADDRESSING LIQUID-CRYSTAL DISPLAY DEVICE USING LATERAL ELECTRIC FIELD AND HAVING TWO STORAGE CAPACITORS

BACKGROUND OF B THE INVENTION

1. Field of the Invention

The present invention relates generally to a Liquid-Crystal Display (LCD) device. More particularly, the invention relates to an active-matrix addressing LCD device using lateral electric field, which improves the transmittance and the fabrication yield.

2. Description of the Related Art

Active-matrix addressing LCD devices that use Thin-Film Transistors (TFTs) as the switching elements for respective pixels, which provide high-level image quality, have been extensively used as display devices for portable or note-book type computers. Recently, they have been used as monitoring devices of space-saving desktop computers as well.

Active-matrix addressing LCD devices are classified into two types. With the devices of the first type, the orientation of the molecular axis of liquid crystal, which is called the "director", is rotated in a plane perpendicular to the pair of substrates, thereby displaying desired images. With the devices of the second type, the "director" is rotated in a plane parallel to the pair of substrates, thereby displaying desired images. A typical one of the first type LCD devices is of the Twisted Nematic (TN) mode. A typical one of the second type LCD devices is of the In-Plane Switching (IPS) mode, which may be called the "lateral electric field" mode because the liquid crystal molecules existing in the liquid crystal layer are rotated or driven by electric field generated to be approximately parallel to the pair of substrates.

The IPS mode LCD device has an advantage that the obtainable viewing angle is wider than that of the TN mode LCD devices and therefore, the device of this type has been often used for large-scale display devices. This is due to the following reason. Specifically, with the IPS mode LCD device, a viewer or user always sees the displayed images approximately along the short axis of liquid-crystal molecules even if he/she moves his/her point of view. Therefore, the "tilt angle" of the liquid-crystal molecules has no or very low viewing angle dependence, resulting in a wider viewing angle.

On the other hand, the IPS mode LCD device has a disadvantage that an obtainable aperture ratio is low and as a result, the transmittance is reduced. This is because the driving electrodes, which are made of opaque, conductive material for the scan lines or the data lines, are formed on one of the pair of substrates coupled with each other in such a way as to keep a liquid crystal layer therebetween. Thus, various improvements have been discussed and developed to raise the transmittance so far.

One of the improvements developed before is disclosed in the Japanese Patent No. 3123273 published on Oct. 27, 2000. This improvement or technique has the following features:

(i) The parts of the signal lines, which face the liquid crystal layer, are partially covered with a conductor. (ii) The conductor is electrically connected to the source electrodes or the common electrode for applying the electric field approximately parallel to the substrates to the liquid crystal layer.

Because of these features (i) and (ii), undesired electric field from the signal lines is shielded or blocked with the common electrode, thereby expanding the effective display area of each pixel. As a result, the aperture ratio of each pixel is increased and therefore, the light utilization efficiency is enhanced.

Moreover, the Japanese Non-Examined Patent Publication No. 9-73101 published on Mar. 18, 1997 discloses an improvement that transparent material is used for making the electrodes for driving the liquid crystal, thereby enhancing the light utilization efficiency.

By the way, the active-matrix addressing LCD device has the basic operation principle as follows. This principle is applicable regardless of the operation mode of the LCD device.

Specifically, desired electric charges are written into the dielectric liquid crystal layer by way of the TFTs as the switching elements, thereby controlling the orientation of the liquid crystal molecules existing in the liquid crystal layer with the use of the electric field generated by the electric charges thus written. Thus, the transmitting state of external light through the liquid crystal layer is controlled to thereby display images on the screen of the LCD device as desired.

It is ideal that the electric charges written (i.e., the electric field generated) are kept until new electric charges are written into the liquid crystal layer at a next timing (i.e., within one frame). However, the liquid crystal has dielectric constant anisotropy and thus, the liquid crystal molecules are rotated according to the electric field. This leads to reduction of the electric field generated, which will be termed the "dielectric relaxation" below. To suppress the electric field reduction due to the dielectric relaxation, "storage capacitors", the capacitance of which has a specific ratio to the capacitance of the liquid crystal capacitors, are formed to increase the quantity of electric charges to be written when the TFTs are turned on. As a result, even if the dielectric relaxation occurs and the electric field is reduced, the electric charges written into the storage capacitors are dispersed in the liquid crystal capacitors to compensate the electric field reduction.

The storage capacitors have an effect of suppressing the pixel voltage reduction (which is generally termed the "feed through voltage $\Delta V_p$") that occurs when the TFTs are transferred from the turn-on state to the turn-off state. Therefore, these storage capacitors are used as a measure against flickers too.

The cause of the "feed through" is the parasitic capacitance $C_{gs}$ between the gate electrode of the TFT and the source electrode thereof. Specifically, when the TFT is turned on by the gate pulse signal, electric charge is written and stored in the liquid crystal capacitor (capacitance: $C_{cl}$) and the storage capacitor (capacitance: $C_{sc}$) in each pixel. At the moment the TFT is turned off, the electric charge that has been stored in the liquid crystal capacitor and the storage capacitor is redistributed to the respective capacitors, resulting in the "feed through" phenomenon. Since the LCD device using the lateral electric field does not require the transparent electrode formed on the color filter substrate (i.e., the opposite substrate) of the TN mode LCD device, the lines of electric force generated from the pixel electrodes and the common electrode will penetrate the color layer provided on the opposite substrate. In other words, the feed through voltage $\Delta V_p$ of the LCD device using the lateral electric field is expressed as a function of the color layer capacitor (capacitance: Ccolor). As a result, the feed through voltage ΔVp is given by the following equation (1).

$$\Delta Vp = Cgs/(Cgs+Csc+Clc+Ccolor) \times (Vgon-Vgoff) \quad (1)$$

where Vgon and Vgoff are turn-on and turn-off gate voltages of the TFT, respectively.

As understood from the above explanation, to suppress or decrease the feed through voltage ΔVp, it is necessary for the IPS mode LCD device to increase the storage capacitance Csc.

The explanation presented below will be made for the IPS mode LCD device as a typical example of the LCD devices using lateral electric field. However, needless to say, it is applicable to any other mode of the LCD devices using lateral electric field.

The storage capacitors in the IPS mode LCD device are typically realized by forming an interlayer dielectric layer between the pixel electrodes and a metal or conductive layer kept at a fixed voltage by two methods, the "common storage" method and the "gate storage" method.

The "gate storage" method is a method to form the storage capacitor between the prior-stage scanning line and the corresponding pixel electrode. In this method, the storage capacitor between the prior-stage scanning line and the corresponding pixel electrode serves as a load of the corresponding scanning line signal and therefore, there are disadvantages that the corresponding gate line signal is likely to be delayed and that the panel transmittance within the panel plane is likely to be dispersed.

On the other hand, the "common storage" method is a method to form the storage capacitor between the common electrode and the pixel electrode. In the IPS mode LCD device, the comb-tooth-shaped common electrode is provided in each pixel and thus, the storage capacitor is easily formed by the common electrode and the pixel electrode. Moreover, since no load is given to the scanning line signal, the scanning signal is not likely to be delayed. Accordingly, the "common storage" method is preferably used for large-scale IPS mode LCD devices.

The common electrode lines and the data lines are usually made of opaque, conductive material when the LCD device is large-sized. The reason is as follows:

Specifically, the common electrode lines need to be formed by using a low-resistance wiring material (e.g., a single layer of Cr, Ti, Mo, W, or Al or a multilayer structure of those metals) to prevent the propagation delay of the common electrode voltage or potential. Since these electrode materials are opaque, the areas covered with the common electrode lines do not serve as apertures and thus, they give no contribution to transmission of light. Moreover, when the common electrode lines are formed by the same material as that of the scanning lines in the same process step of forming the scanning lines to avoid the increase of the necessary fabrication process steps of the TFTs, low-resistance, opaque, conductive material needs to be used to lower the wiring resistance of the scanning lines and the common electrode lines and to protect the back channel sections of the TFTs against external light. In this case also, the areas covered with the common electrode lines do not serve as apertures and thus, they give no contribution to transmission of light. Additionally, low-resistance, opaque wiring material needs to be used to lower the wiring resistance of the data lines.

Moreover, if the common electrodes are formed to cover the data lines in order to prevent the electric field generated by the data line signals from being applied to the liquid crystal layer by way of the apertures, the parasitic capacitance between the data lines and the common electrode increases. This makes it likely to delay the transmission of the data line signals. To prevent the delay of the data line signals, the increase of the parasitic capacitances between the data lines and the common electrode needs to be suppressed. This is realized by forming an interlayer dielectric layer with a low dielectric constant between the data lines and the common electrode that shields the data lines, or by forming a thick interlayer dielectric layer with a comparatively high dielectric constant between the data lines and the common electrode. As a result, the storage capacitor with a sufficiently large capacitance for stable displaying operation is unable to be formed between the level of the data lines and the level of the common electrode. Instead, this capacitor needs to be formed between the level of the common electrode lines and the level of the data lines. If so, the interlayer dielectric layer between the common electrode lines and the data lines may be thinned to increase the capacitance of the said storage capacitor. However, the probability that the fabrication yield degrades due to the electrical short circuit between the lines will increase and at the same time, the switching characteristics of the TFTs will be badly affected. Accordingly, it is most effective for the TFT array that two common electrode lines are formed to sandwich the scanning line to increase the area of the storage capacitor.

Furthermore, with the IPS mode LCD device, as shown in FIG. 22, the direction of the electric field applied to the liquid crystal layer is complicated at the end of each "column". The "column" is defined as an elongated area surrounded by the tooth of the comb-tooth-shaped common electrode and the adjoining tooth of the comb-tooth-shaped pixel electrode. Thus, the following phenomenon tends to occur due to the complicated electric field.

Specifically, a region (i.e., a normal domain) where the orientation of the liquid crystal molecules is rotated in a desired direction is formed and at the same time, another region (i.e., an abnormal domain) where the orientation of the liquid crystal molecules is rotated in an opposite direction to the desired direction is formed. In the abnormal domain, the orientation of the liquid crystal molecules is unable to be rotated in the desired direction unless the stronger electric field than that of the normal domain is applied to. As a result, the abnormal domain scarcely makes contribution to increase of the panel transmittance of the LCD device, which means that the panel transmittance is lowered. Moreover, since the orientation of the liquid crystal molecules is scarcely rotated at the boundary between the normal and abnormal domains regardless of the intensity of the applied electric field, the existence of the boundary lowers the panel transmittance in each pixel. Accordingly, some contrivance is necessary for the IPS mode LCD device to prevent the formation of the abnormal domain.

A technique for preventing the formation of the abnormal domain is disclosed by the Japanese Patent No. 2973934 published on Sep. 31, 1999. In this technique, the electrodes for driving the liquid crystal layer (i.e., the pixel electrodes and the common electrode) are formed to have the staggered or uneven patterns, where each of the electrodes has lateral protrusions and depressions. Using this staggered or uneven pattern of the electrodes, the electric field applied to the liquid crystal layer is controlled well.

As explained above, it is necessary to restrict or regulate the complicated electric-field direction at the column ends, and to sandwich the scanning line by two common electrode lines (in other words, to form two common electrode lines for each pixel). These are to prevent the disorder of the alignment of the liquid crystal molecules due to the leaked electric field from the scanning line signals and the opposite rotation of the liquid crystal molecules, thereby implementing desired LCD reliability improvement. Therefore, at least two storage capacitors for stabilizing the display operation can be formed for each pixel, thereby advantageously increasing the total storage capacitance, because two common electrode lines are provided for each pixel. However, if at least two capacitors are formed to be apart from each other in each pixel, patterned "pixel voltage or potential layers" need to be formed in the same level as the data lines and at the same time, the pixel potential layers need to be kept at the same potentials as those of the pixel electrodes applied through the TFTs.

If the pixel potential layers are formed in each pixel, which are used to form two or more storage capacitors in each pixel, are constituted in such a way as to be electrically connected to each other by way of parts of a conductive layer, it was found that the following problems occurred.

The first problem is that the total panel transmittance is lowered. Specifically, if a conductive layer for interconnecting the storage capacitors in each pixel with each other is formed by the same metal layer as the data lines and at the same time, the said metal layer is overlapped with the pixel electrodes, the rotation of the liquid crystal molecules caused by the applied electric field makes no contribution to the panel transmittance in the overlapping areas of the said metal layer and the pixel electrodes. As a result, the obtainable total panel transmittance is lowered.

The second problem is that the effective aperture ratio is decreased and the transmittance is lowered. Specifically, the conductive layer (i.e., the metal layer made of the same material as that of the data lines) and the pixel electrodes are formed in different levels in different process steps. Therefore, if an overlay error is present for these two layers, the overlapping areas of the conductive layer and the pixel electrodes expand and thus, the effective aperture ratio for each pixel decreases. This means that the transmittance is lowered.

The third problem is that the luminance is lowered in the all-white displaying operation. Specifically, in the overlapping areas of the conductive layer (i.e., the metal layer made of the same material as that of the data lines) and the comb-tooth-shaped pixel electrodes, the electric field strength is increased locally. Thus, the electric field fluctuates in each pixel, which results in the luminance lowering in the all-white displaying operation.

The fourth problem is that the fabrication yield is lowered. Specifically, the transparent pixel electrodes and the transparent common electrode tend to be disconnected locally due to the step-shaped gaps between the pixel and common electrodes and their underlying metal layers (i.e., the scanning lines and the data lines) in the etching process, resulting in undesired disconnections in the patterned electrodes. Thus, the lateral electric field is not applied partially to the liquid crystal layer, resulting in a defect in the displaying operation. This leads to lowering in the fabrication yield of the LCD device.

SUMMARY OF THE INVENTION

Accordingly, an object of the present invention is to provide an active-matrix addressing LCD device using lateral electric field that realizes a higher transmittance and a higher fabrication yield.

Another object of the present invention is to provide an active-matrix addressing LCD device using lateral electric field that improves the aperture ratio without raising the fabrication cost.

The above object together with others not specifically mentioned will become clear to those skilled in the art from the following description.

According to a first aspect of the present invention, an active-matrix addressing LCD device is provided. This device comprises:

an active element substrate;

an opposite substrate coupled with the active element substrate;

a liquid crystal layer formed between the active element substrate and the opposite substrate;

pixel electrodes formed on the active element substrate in such a way as to form pixels arranged in a matrix array;

a common electrode formed on the active element substrate in such a way as to be commonly used for all the pixels;

switching elements formed on the active element substrate, which are used for the respective pixels;

scanning lines formed on the active element substrate, through which scanning signals are transmitted to the elements;

data lines formed on the active element substrate, through which data signals are transmitted to the elements;

common electrode lines formed on the active element substrate, through which a fixed potential are applied to the common electrode;

two of the common electrode lines being used for each of the pixels;

patterned pixel potential layers formed on the active element substrate in such a way as to be overlapped with the common electrode lines by way of an intervening dielectric layer;

two of the pixel potential layers being used for each of the pixels;

wherein a first one of the common electrode lines, a first one of the pixel potential layers, and the intervening dielectric layer constitute a first storage capacitor for each of the pixels and at the same time, a second one of the common electrode lines, a second one of the pixel potential layers, and the intervening dielectric layer constitute a second storage capacitor for the same pixel;

and wherein the first one of the pixel potential layers and the second one of the pixel potential layers are electrically connected to each other by way of a corresponding one of the pixel electrodes;

and wherein the first storage capacitor is located near a corresponding one of the scanning lines and the second storage capacitor is located near an adjoining one of the scanning lines in the said pixel.

With the LCD device according to the first aspect of the present invention, the first one of the common electrode lines, the first one of the pixel potential layers, and the intervening dielectric layer constitute the first storage capacitor for each of the pixels and at the same time, the second one of the common electrode lines, the second one of the pixel potential layers, and the intervening dielectric layer constitute the second storage capacitor for the same pixel. Also, the first one of the pixel potential layers and the second one of the pixel potential layers are electrically connected to each other by way of a corresponding one of the pixel electrodes. The pixel electrodes are transparent.

Therefore, the above-identified first problem is solved. In other words, the rotation of the liquid crystal molecules caused by the applied electric field makes full contribution to the panel transmittance. As a result, the obtainable total panel transmittance is prevented from being lowered. This means that a higher transmittance is obtainable.

Because no additional interconnection metal layer is necessary for interconnecting the first and second storage capacitors in each pixel, the count of the fabrication process steps is decreased. This leads to a higher fabrication yield.

Moreover, the first one of the pixel potential layers and the second one of the pixel potential layers are electrically connected to each other by way of a corresponding one of the pixel electrodes. No additional interconnection metal layer is necessary. Therefore, the possible overlay error as referred in the above-identified second problem is avoided. As a result, the aperture ratio is improved without raising the fabrication cost.

In a preferred embodiment of the device according to the first aspect of the invention, a single interlayer dielectric layer made of inorganic material is additionally provided between the data lines and the common electrode.

In another preferred embodiment of the device according to the first aspect of the invention, a color layer is additionally provided on the opposite substrate.

In still another preferred embodiment of the device according to the first aspect of the invention, no color layer is provided on the opposite substrate.

In a further preferred embodiment of the device according to the first aspect of the invention, the first and second pixel potential layers for each of the pixels are arranged in a direction approximately parallel to the data lines to be apart from each other. Each of the first and second pixel potential layers is electrically connected to the corresponding one of the pixel electrodes by way of a contact hole.

In a still further preferred embodiment of the device according to the first aspect of the invention, the common electrode and the pixel electrodes are transparent and located in a level nearer to the liquid crystal layer than the data lines. The data lines are entirely covered with the common electrode by way of a dielectric layer except for vicinities of the scanning lines. The common electrode is electrically connected to the common electrode lines by way of corresponding contact holes for the respective pixels. A black matrix is additionally formed on the opposite substrate in such a way as to have a width less than a width of the common electrode in areas where the data lines are entirely covered with the common electrode. No light-shielding layer is formed between the common electrode entirely covering the data lines and an adjoining one of the pixel electrodes thereto.

In this embodiment, it is preferred that the pixel electrodes and the common electrode are formed in a same level. However, the pixel electrodes and the common electrode may be formed in different levels by way of a dielectric layer. In this case, preferably, the common electrode faces the liquid crystal layer by way of an alignment layer.

When the pixel electrodes and the common electrode are formed in different levels by way of a dielectric layer, the fabrication cost rises slightly compared with the case where these electrodes are formed in the same level. Instead, there is an additional advantage that the margin for designing the electrodes is expanded and as a result, the transmittance is improved.

When the common electrode faces the liquid crystal layer by way of an alignment layer, the parasitic capacitances between the data lines and the common electrode covering the same are decreased and at the same time, the delay of the data signals through the data lines is prevented. As a result, there is an additional advantage that higher aperture ratio and higher image uniformity are obtainable.

In a still further preferred embodiment of the device according to the first aspect of the invention, the common electrode is made of a same conductive material as that of terminals used for applying electrical signal to at least one of the scanning lines, the data lines, and the common electrode lines. The common electrode is formed in a same process step as that of the terminals. There is an additional advantage that the terminals are formed without increasing any process step.

In this embodiment, preferably, the pixel electrodes and the common electrode are formed to be wider than the common electrode lines and the data lines in overlapped areas of the pixel electrodes and the common electrode with the common electrode lines and the data lines. There is an additional advantage that local disconnection of the pixel electrodes and the common electrode is prevented.

It is preferred that the pixel electrodes and the common electrode are made of ITO or IZO. Since ITO and IZO are electrochemically stable, there is an additional advantage that the pixel electrodes and the common electrode are formed to be highly transparent as desired.

According to a second aspect of the present invention, another active-matrix addressing LCD device is provided. This device comprises:

an active element substrate;

an opposite substrate coupled with the active element substrate;

a liquid crystal layer formed between the active element substrate and the opposite substrate;

pixel electrodes formed on the active element substrate in such a way as to form pixels arranged in a matrix array;

a common electrode formed on the active element substrate in such a way as to be commonly used for all the pixels;

switching elements formed on the active element substrate, which are used for the respective pixels;

scanning lines formed on the active element substrate, through which scanning signals are transmitted to the elements;

data lines formed on the active element substrate, through which data signals are transmitted to the elements;

common electrode lines formed on the active element substrate, through which a fixed potential are applied to the common electrode;

two of the common electrode lines being used for each of the pixels;

patterned pixel potential layers formed on the active element substrate in such a way as to be overlapped with the common electrode lines by way of an intervening dielectric layer;

two of the pixel potential layers being used for each of the pixels;

wherein a first one of the common electrode lines, a first one of the pixel potential layers, and the intervening dielectric layer constitute a first storage capacitor for each of the pixels and at the same time, a second one of the common electrode lines, a second one of the pixel potential layers, and the intervening dielectric layer constitute a second storage capacitor for the same pixel;

and wherein the first one of the pixel potential layers and the second one of the pixel potential layers are electrically connected to each other by way of an interconnection electrode formed on the active element substrate in such a way as to be apart from the liquid crystal layer at a largest distance;

and wherein the first storage capacitor is located near a corresponding one of the scanning lines and the second storage capacitor is located near an adjoining one of the scanning lines in the said pixel.

The LCD device according to the second aspect of the invention has the same structure as the LCD device according to the first aspect of the invention, except that "the first one of the pixel potential layers and the second one of the pixel potential layers are electrically connected to each other by way of an interconnection electrode formed on the active element substrate in such a way as to be apart from the liquid crystal layer at a largest distance".

Therefore, the penetrating light is blocked by the interconnection electrodes. However, the electrodes are sufficiently apart from the liquid crystal layer. Thus, the interconnection electrodes will apply very weak electric field to the liquid crystal in the liquid crystal layer. This means that electric field fluctuation for the respective columns in each pixel will be small. In other words, the interconnection electrodes do not affect badly the obtainable transmittance, which corresponds to the device of the first embodiment where the interconnection electrodes are formed by the transparent pixel electrodes. As a result, the device of the second aspect of the invention has the same advantages as those of the device of the first aspect of the invention.

In a preferred embodiment of the device according to the second aspect of the invention, the interconnection electrodes are located in a same level as the common electrode lines and the scanning lines.

In another preferred embodiment of the device according to the second aspect of the invention, the common electrode lines are located in a different level from that of the scanning lines. The interconnection electrodes are located in a same level as the common electrode lines.

In a still another preferred embodiment of the device according to the second aspect of the invention, the first and second pixel potential layers for each of the pixels are arranged in a direction approximately parallel to the data lines to be apart from each other. Each of the first and second pixel potential layers is electrically connected to the corresponding one of the pixel electrodes by way of a contact hole.

In a further preferred embodiment of the device according to the second aspect of the invention, the common electrode and the pixel electrodes are transparent and located in a level nearer to the liquid crystal layer than the data lines. The data lines are entirely covered with the common electrode by way of a dielectric layer except for vicinities of the scanning lines. The common electrode is electrically connected to the common electrode lines by way of corresponding contact holes for the respective pixels. A black matrix is additionally formed on the opposite substrate in such a way as to have a width less than a width of the common electrode in areas where the data lines are entirely covered with the common electrode. No light-shielding layer is formed between the common electrode entirely covering the data lines and an adjoining one of the pixel electrodes thereto.

In this embodiment, it is preferred that the pixel electrodes and the common electrode are formed in a same level. However, the pixel electrodes and the common electrode may be formed in different levels by way of a dielectric layer. In this case, preferably, the common electrode faces the liquid crystal layer by way of an alignment layer.

In a still further preferred embodiment of the device according to the second aspect of the invention, the common electrode is made of a same conductive material as that of terminals used for applying electrical signal to at least one of the scanning lines, the data lines, and the common electrode lines. The common electrode is formed in a same process step as that of the terminals.

In this embodiment, preferably, the pixel electrodes and the common electrode are formed to be wider than the common electrode lines and the data lines in overlapped areas of the pixel electrodes and the common electrode with the common electrode lines and the data lines.

It is preferred that the pixel electrodes and the common electrode are made of ITO or IZO.

BRIEF DESCRIPTION OF THE DRAWINGS

In order that the present invention may be readily carried into effect, it will now be described with reference to the accompanying drawings.

FIGS. 5A to 5C are partial, schematic cross-sectional views along the lines A–A', B–B', C–C', D–D', and E–E' in FIG. 1 and the cross-sectional views of the terminal sections G and H, respectively, which show the process steps of a method of fabricating the LCD device according to the first embodiment of FIG. 1.

FIGS. 10A to 10C are partial, schematic cross-sectional views along the lines A–A', B–B', C–C', D–D', and E–E' in FIG. 7 and the cross-sectional views of the terminal sections G and H, respectively, which show the process steps of a method of fabricating the LCD device according to the second embodiment of FIG. 7.

FIG. 14 is partial, schematic cross-sectional views along the lines A–A', B–B', C–C', D–D', and E–E' in FIG. 11 and the cross-sectional views of the terminal sections G and H, which are shown in a lump in a single figure and which are separated from each other by curved lines.

DETAILED DESCRIPTION OF THE PREFERRED EMBODIMETNS

Figure 1:
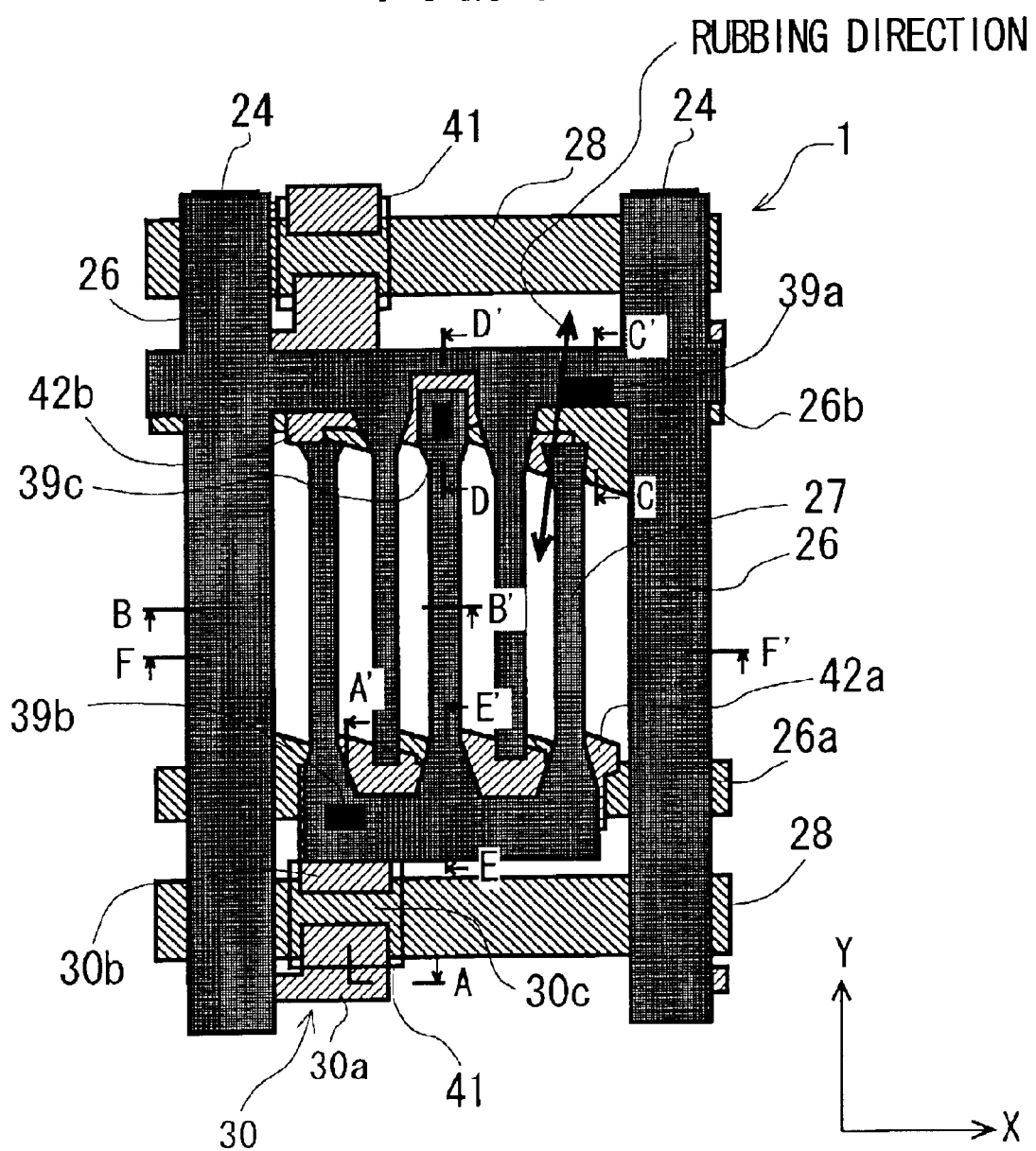
FIG. 1 is a schematic plan view showing the layout of the active element substrate of an IPS mode active-matrix addressing LCD device according to a first embodiment of the invention.

Preferred embodiments of the present invention will be described in detail below while referring to the drawings attached.

First Embodiment

An IPS mode active-matrix addressing LCD device 1 according to a first embodiment of the invention has the structure as shown in FIGS. 1, 2, 3A, 3B and 4.

Figure 2:
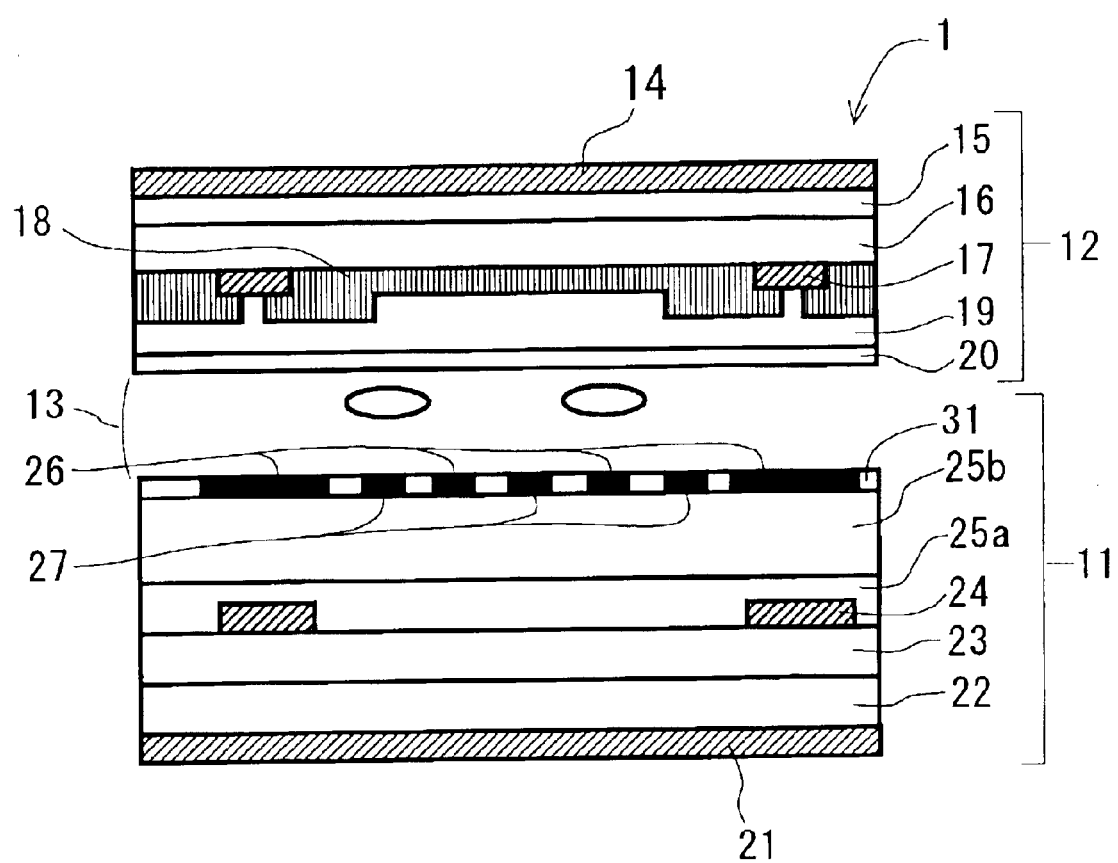
FIG. 2 is a partial, schematic cross-sectional view along the line F–F' in FIG. 1.

As clearly seen from FIG. 2, the LCD device 1 according to the first embodiment comprises a rectangular active element substrate 11, a rectangular opposite substrate 12 coupled with the substrate 11 parallel to each other, and a liquid crystal layer 13 sandwiched by the substrates 11 and 12 and confined in the gap between the substrates 11 and 12. The combination of the two substrates 11 and 12 and the intervening liquid crystal layer 13 is referred as the "LCD panel" later.

In this specification, the side or surface of the active element substrate 11 near the liquid crystal layer 13 is termed the "inner side" or "inner surface" and the other side thereof far from the liquid crystal layer 13 is termed the "outer side" or "outer surface". This definition is applied to the opposite substrate 12 as well.

As shown in FIG. 2, the active element substrate 12 has a polarizer plate 14 fixed to its outer surface. The opposite substrate 11A has a polarizer plate 21 fixed to its outer surface.

The opposite substrate 12 has the following structure.

Specifically, the opposite substrate 12 comprises a second rectangular, transparent, dielectric plate 16, a black matrix 17 formed on the inner surface of the plate 16, a color layer 18 formed on the inner surface of the plate 16 to cover the black matrix 17, and a planarization layer 19 formed on the color layer 18. The black matrix 17, which serves as a patterned light-shielding layer, is to form or define pixel areas by partitioning the inner surface of the plate 16. The color layer 18 is patterned to be located in the respective pixel areas and overlapped with the black matrix 17 in its peripheral area. The color layer 18 is formed by a patterned resin layer containing red (R), green (G), and blue (B) dyes or pigments. The planarization layer 19 covers the color layer 18 and the exposed black matrix 17 from the layer 18. The layer 19 is formed by a transparent overcoat layer. To prevent electrification due to hand-contact of a user with the outer surface of the LCD panel from electrically affecting the liquid crystal layer 13, a transparent conductive layer 15 is formed on the outer surface of the second transparent plate 16. The polarizer plate 14 is located on the layer 15.

On the other hand, the active element substrate 11 has the following structure.

Specifically, the active element substrate 11 comprises a first rectangular, transparent, dielectric plate 22, scanning lines 28, gate electrodes 30c of TFTs 30, common electrode lines 26a and 26b, a first interlayer dielectric layer 23, amorphous silicon (a-Si) islands 41, data lines 24, source electrodes 30b of the TFTs 30, drain electrodes 30a of the TFTs 30, a first dielectric layer 25a, a second dielectric layer 25b, a common electrode 26, and pixel electrodes 27.

The first dielectric, transparent plate 22 is made of a similar material (e.g., glass) to the second plate 16 of the opposite substrate 12. The scanning lines 28, the gate electrodes 30c, and the common electrode lines 26a and 26b are formed by a patterned first metal layer formed on the inner surface of the plate 22. The gate electrodes 30c are united with the corresponding scanning lines 28. The first interlayer dielectric layer 23 is formed on the first metal layer (i.e., on the scanning lines 28, the gate electrodes 30c, and the common electrode lines 26a and 26b). The a-Si islands 41, which are formed on the first interlayer dielectric layer 23, are located in the respective overlapping areas with the gate electrodes 30c. The data lines 24, the source electrodes 30b, and the drain electrodes 30a are formed by a second metal layer formed on the first interlayer dielectric layer 23. The second interlayer dielectric layer 25 is formed by a first dielectric sublayer 25a formed on the second metal layer, and a second dielectric sublayer 25b formed on the sublayer 25a. The common electrode 26 and the pixel electrodes 27 are made of a transparent conductive material located on the second interlayer dielectric layer 25.

The active element substrate 11 further comprises an alignment layer 31 on its inner surface. The opposite substrate 12 further comprises an alignment layer 20 on its inner surface. As shown in FIG. 1, these two alignment layers 31 and 20 have been subject to a rubbing process in such a way that the liquid crystal molecules confined in the liquid crystal layer 13 are homogeneously aligned in a direction inclined at approximately 10° to 30° with respect to the extension direction of the stick-shaped (or, comb-tooth-shaped) pixel electrodes and the stick-shaped (or, comb-tooth-shaped) common electrode 26. The alignment layers 31 and 20 are opposed to each other at the specific gap. The initial angle of the alignment direction is termed the "initial alignment orientation" of the liquid crystal molecules. These two substrates 11 and 12 are coupled to each other to leave the specified gap therebetween, thereby forming the LCD panel. The gap is sealed by a sealing member (not shown) extending along the peripheries of the substrates 11 and 12. The liquid crystal is confined in the gap to form the liquid crystal layer 13.

Next, the structure of the active element substrate 11 will be explained in more detail with reference to FIGS. 3A, 3B, and 4.

Figure 3A:
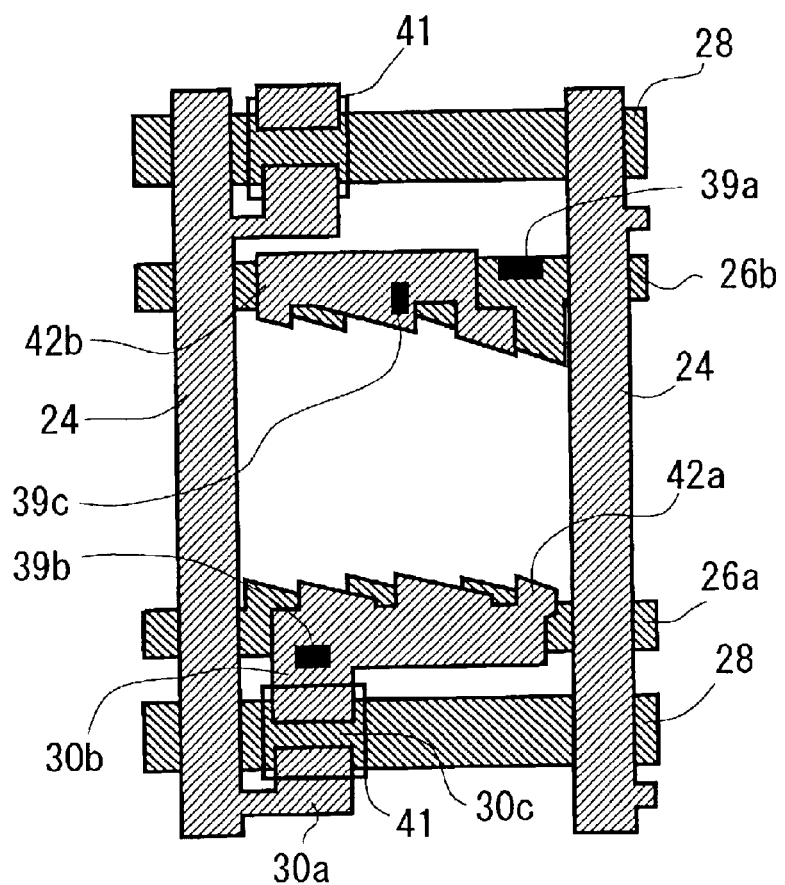
FIG. 3A is a schematic plan view showing the layout of the conductive layers of the LCD device lower than the ITO layer according to the first embodiment of FIG. 1.

FIG. 3A shows the state where the first and second metal layers and their underlying layers are formed. FIG. 3B shows the state where the transparent electrode material (e.g., ITO) is formed. FIG. 4 shows the cross-sections along the line A–A' (the TFT 30), B–B' (part of the pixel area), C–C' (the contact hole 39a for the common electrode 26), D–D' (the contact hole 39c for the pixel potential layer 42b), and E–E' lines (part of the pixel electrode 27). FIG. 4 additionally shows the cross sections of the external contact or terminal section G of the common electrode lines 26a and 26b, and the external contact or terminal section H of the data lines 24, which do not appear in FIGS. 1, 2, 3A, and 3B.

As shown in FIG. 3A, on the inner surface of the active element substrate 11, the scanning lines 28 (through which the scanning signals are transmitted) and the common electrode lines 26a and 26b (through which the reference voltage or potential is applied) are formed by the first metal layer made of a low-resistance metal, such as chromium (Cr), in such a way as to extend along the X direction (i.e., the horizontal direction in FIG. 1). The reference voltage or potential is applied to the lines 26a and 26b at specific positions in the periphery of the LCD panel, which does not appear in these figures. The scanning lines 28 (and the gate electrodes 30c of the TFTs 30) are arranged at equal intervals for the respective pixels in the Y direction (i.e., the vertical direction in FIG. 1) perpendicular to the X direction. One of the common electrode lines 26a and its adjoining one of the common electrode lines 26b are arranged in such a way as to sandwich a corresponding one of the scanning lines 28 between them.

Similarly, the data lines 24 (to which the data signals are applied) are formed by the second metal layer made of a low-resistance metal (e.g., Cr) in such a way as to extend along the Y direction and to be arranged at equal intervals for the respective pixels in the X direction. As explained later, the drain and source electrodes 30a and 30b of the TFTs 30 and the pixel potential layers 42a and 42b are formed by the second metal layer. In each of the pixel areas, one of the pixel potential layers 42a is located near the scan line 28 in the said stage and one of the pixel potential layers 42b is located near the scan line 28 in the prior (or next) stage. The former layer 42a may be referred as the "said-stage pixel potential layer" and the latter layer 42b is referred as the "prior-stage pixel potential layer" later.

The TFTs 30 for the respective pixels are located near the respective intersections of the scanning lines 28 and the data lines 24. The gate electrodes 30c are formed by parts of the respective scanning lines 28. On the first interlayer dielectric layer 23 covering the gate electrodes 30c, the a-Si islands 41 of the TFTs 30 are formed. The drain electrodes 30a and source electrodes 30b of the TFTs 30 are formed to contact the respective islands 41 by the second metal layer used for making the data lines 24. Thus, the gate electrodes 30c are united with the corresponding scanning lines 28 while the drain electrodes 30a are electrically connected to the data lines 24. The source electrodes 30b are united with the corresponding pixel potential layers 42a adjacent to the corresponding said-stage scanning lines 28.

A second interlayer dielectric layer 25 is formed to cover the patterned second metal layer. Here, as shown in FIG. 4, the layer 25 has a two-layer structure comprising a lower first dielectric sublayer 25a and an upper second dielectric sublayer 25b. The layer 25, which has a total thickness of 1 to 2 μm here, may be formed by a single organic or inorganic layer. Needless to say, the layer 25 may be formed by any other dielectric material and have any other thickness.

Figure 3B:
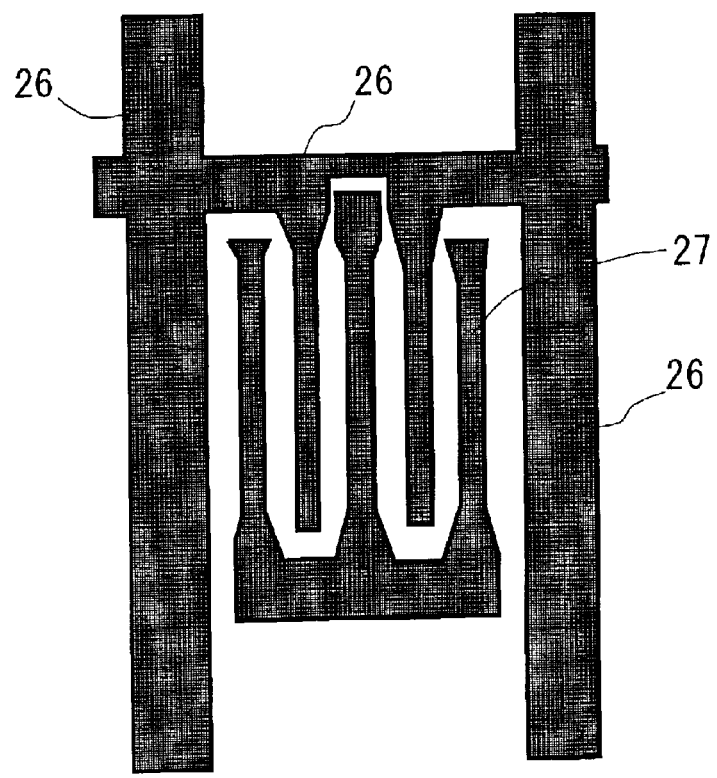
FIG. 3B is a schematic plan view showing the layout of the upper ITO layer of the LCD device according to the first embodiment of FIG. 1.
Figure 4:
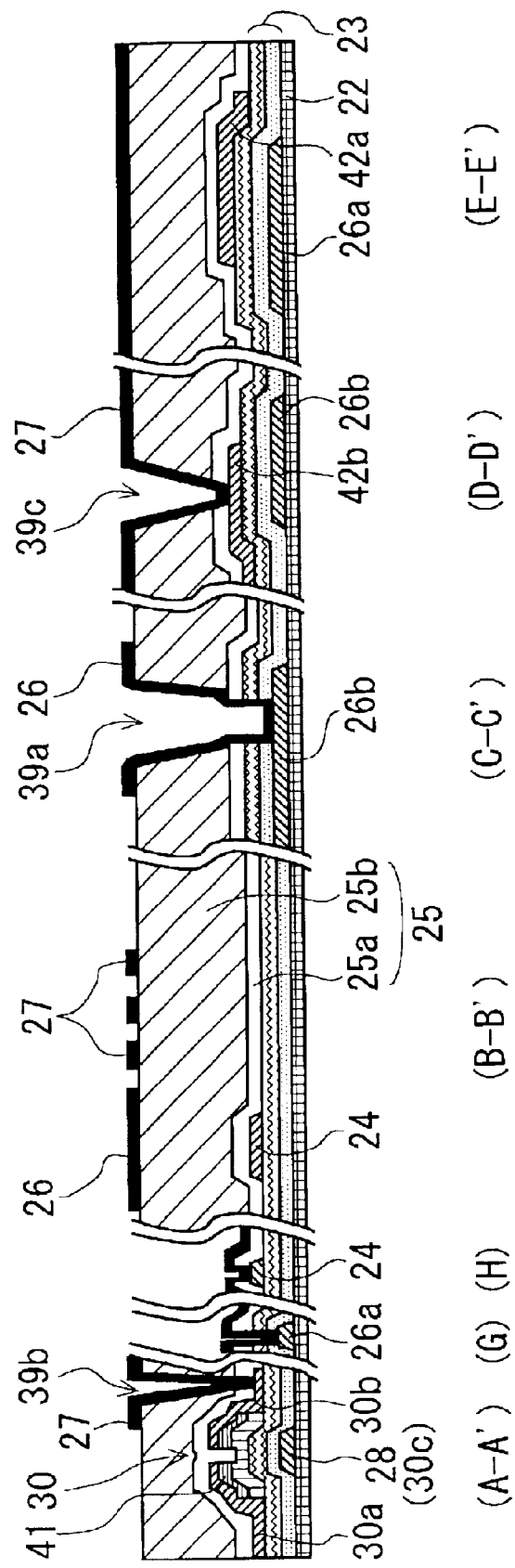
FIG. 4 is partial, schematic cross-sectional views along the lines A–A', B–B', C–C', D–D', and E–E' in FIG. 1 and the cross-sectional views of the terminal sections G and H, which are shown in a lump in a single figure and which are separated from each other by curved lines.

On the second interlayer dielectric layer 25, as shown in FIG. 3B, the common electrode 26 and the pixel electrodes 27 are formed. These electrodes 26 and 27 are made of a transparent electrode (i.e., conductive) material, i.e., Indium Tin Oxide (ITO) The common electrode 26, which is approximately ladder-shaped or matrix-shaped, is formed to overlap with the respective common electrode lines 26b and the data lines 24, extending in the X and Y directions. Parts of the common electrode 26 are formed to be wider than the remainder, thereby entirely covering the underlying data lines 24 except for the intersections of the data lines 24 and the scanning lines 28 and their vicinities. The pixel electrodes 27 are located near the respective intersections of the scanning lines 28 and the data lines 24 for the respective pixels. The elongated areas surrounded by the teeth or sticks of the common electrode 26 and those of the corresponding pixel electrodes 27 are termed the "columns".

In each of the pixels, the common electrode 26 and the pixel electrode 27 are comb-teeth-shaped. The rows of sticks or teeth of the electrodes 26 and 27, which extend parallel to the data lines 24, are engaged with each other and arranged alternately along the scanning lines 28, as clearly shown in FIG. 3B. The common electrode 26 is connected to the corresponding common electrode lines 26a and 26b by way of respective contact holes 39a. The pixel electrode 27 is connected to the corresponding source electrode 30b of the TFT 30 and the prior-stage pixel potential layer 42b by way of the contact holes 39b and 39c, respectively, as shown in FIG. 3A. The shape and arrangement of these contact holes 39a, 39b, and 39c are not limited to the example shown here.

On the other hand, with the opposite substrate 12, the black matrix 17 is formed to be locally narrower than the corresponding parts of the common electrode 26 covering the entire data lines 24 in the overlapping areas of the black matrix 17 with the data lines 24, as shown in FIG. 2. This is to block the light leaking from the adjacent pixels and not to block the light penetrating through the common electrode 26.

With the IPS mode active-matrix addressing LCD device 1 according to the first embodiment having the above-described structure, the pixels are selected by the scanning signals supplied through the scanning lines 28 and then, the pixels thus selected are supplied with the data signals through the data lines 24. In each of the pixels selected, electric field is generated between the common electrode 26 and the opposing pixel electrode 27 approximately parallel to the first and second plates 16 and 22. The electric field thus generated rotates the orientation of the liquid crystal molecules existing in the layer 13 in a plane parallel to the plates 16 and 22, thereby displaying desired images on the screen of the LCD device 1.

Since the common electrode 26 and the pixel electrodes 27 are made of transparent, conductive material (i.e., ITO), the overall transparent area is expanded by the areas occupied by the common electrode 26, which raises the aperture ratio.

Moreover, the pixel potential layers 42a and 42b, which are formed by the second metal layer, are formed on the first interlayer dielectric layer 23 in such a way as to overlap with the common electrode lines 26a and 26b along with the data lines 24, respectively. The purpose of the pixel potential layers 42a and 42b is (i) to form large storage capacitors electrically connected in parallel to the liquid crystal capacitors, and (ii) to constitute a structure that prevents the liquid crystal molecules from rotating in reverse. The pixel potential layers 42a and 42b are located at two separate positions along the data lines 24 in each pixel. The pixel potential layer 42a, which is located near the said-stage gate electrode 30c, is united with the corresponding source electrode 30b and thus, the layer 42a is supplied with the voltage or potential for the source electrode 30b. The pixel potential layer 42b, which is located near the prior-stage scan line 28, is electrically connected to the pixel electrode 27 by way of the contact hole 39c. Thus, the layer 42b is supplied with the voltage or potential for the pixel electrode 27. In addition, the contact hole 39a is used to electrically connect the common electrode 26 to the corresponding common electrode line 26b. The contact hole 39b is used to electrically connect the source electrode 30b to the corresponding pixel electrode 27.

As explained above, the two pixel potential layers 42a and 42b in each pixel are interconnected with each other by way of the corresponding transparent pixel electrode 27 as a bridge, two storage capacitors are formed in each pixel, thereby increasing the overall storage capacitance. This means that the display operation is stabilized. Moreover, the two storage capacitors thus formed do not block the light penetrating through the pixel electrode 27 and at the same time, the electric field in the respective columns will be uniform. Therefore, the obtainable transmittance of the LCD device 1 is raised.

Additionally, as clearly shown in FIG. 3A, the pixel potential layers 42a and 42b and the common electrode lines 26a and 26b are patterned to be staggered at their inner edges. Therefore, the reverse rotation of the orientation of the liquid crystal molecules in the liquid crystal layer 13 is prevented.

As explained previously, the width of the common electrode 26 is determined in such a way as to cover the whole data lines 24 except for the respective intersections of the data lines 24 and the scanning lines 28 and their neighborhoods. If the width of the data lines 24 and the width of the respective parts of the common electrode 26 are defined as L(D) and L(COM), respectively, the following relationship is established.

$$L(COM) > L(D)$$

In the intersections of the data lines 24 and the scanning lines 28 and their neighborhoods, large steps (i.e., height differences) are present. Therefore, the width of the common electrode 26 is determined not to cover the data lines 24 in these areas to avoid electrical short circuit between the lines 24 and 28.

Next, the "vertical cross talk" is explained below.

If the common electrode 26 is formed not to entirely cover the data lines 24, electric field will be generated between the non-overlapped parts and the adjoining pixel electrodes 27, resulting in undesired behavior of the liquid crystal. Specifically, the behavior of the liquid crystal is not determined according to the potential difference between the common electrode 26 and the pixel electrodes 27. This phenomenon is termed the "vertical cross talk".

With the LCD device 1 of the first embodiment, the common electrode 26 is formed to almost entirely cover the data lines 24 and therefore, electric field emitted from the data lines 24 are shielded by the common electrode 26. Thus, the "vertical cross talk" is prevented from occurring. It is preferred that the common electrode 26 has lateral projecting (or overhanging) parts from the edge of the corresponding data line 24 by 1.5 µm or greater at each side thereof.

Because the vertical cross talk is prevented, the black matrix 17 needs not have a function of preventing the display malfunction due to the leaked electric field from the data lines 24. Therefore, the matrix 17 needs to have only one function of improving the contrast. This means that the width of the matrix 17 can be decreased. By doing so, the obtainable aperture ratio is increased further.

Thus, the parts of the black matrix 17 over the data lines 24 are narrower than the parts of the matrix 17 over the common electrode 26. In a plan view of the LCD device 1, no light-shielding layer is present between the common electrode 26 covering the data lines 24 and the adjoining pixel electrodes 27. The black matrix 17, which is narrower than the data lines 24, is entirely overlapped with the data lines 24. In other words, if the width of the data lines 24 and the width of the black matrix 17 are defined as L(D) and L(BM), respectively, the following relationship is established.

$$L(D) > L(BM)$$

Since the black matrix 17 is narrower than the data lines 24, all the light penetrating through the overhanging or projecting parts of the common electrode 26 can be utilized. This means that the panel transmittance can be raised furthermore.

In the first embodiment, the width of the black matrix 17 is, for example, set at 6 µm. However, the width is not limited to this. It is preferred that the width is set at 6 µm or greater. This is because the amount of the reflected light increases if the width is less than 6 µm and thus, the screen of the LCD device 1 is difficult for a user to see.

Next, a light-shielding layer provided below the data lines 24 is explained below.

If the black matrix 17 provided on the opposite substrate 12 is sufficiently wide, it is sufficient to block the malfunction-inducing areas. However, the black matrix 17 does not entirely cover the data lines 24 in the LCD device 1 according to the first embodiment. Therefore, to block the malfunction-inducing areas, a light-shielding layer maybe provided below the data lines 24 to shield the light emitted from the backlight (not shown), where the light-shielding layer is electrically connected to the common electrode 26. If the light-shielding layer is not electrically connected to the common electrode 26, the potential is unstable and as a result, direct-current (dc) electric field tends to be generated between the common electrode 26 and the pixel electrodes 27 or tends to cause a malfunction such as cross talk.

Concretely speaking, it is preferred that the light-shielding layer is formed by the first metal layer for the scanning lines 28 in such a way as to be electrically connected to the common electrode lines 26a. Since the common electrode lines 26a and 26b are electrically connected to the common electrode 26 by way of the contact holes 39a, the common electrode lines 26a and 26b may be used as the light-shielding layer in question. The light-shielding layer may be formed by a single layer made of Cr, Ti, Mo, W, or Al or a multilayer structure comprising two sublayers made of these metals. If a multilayer structure is taken, the resistance is decreased furthermore.

The common electrode 26 is made of a transparent, conductive material (i.e., ITO) and thus, the total transparent area of the LCD device 1 of the first embodiment increases to raise the aperture ratio, as described above. However, there is a disadvantage that the sheet resistance of ITO is as high as approximately 100 $\Omega/\square$. Since the common electrode 26 is electrically connected to the common electrode line 26a or 26b in each of the pixels, the overall resistance of the common electrode 26 is lowered and at the same time, redundancy is given. Thus, by making the common electrode 26 with ITO, the reliability of the LCD device 1 of the first embodiment is improved.

The common electrode 26 may be made of the same material as the material covering the terminals of the LCD device 1. Specifically, as shown in the common-electrode contact section (G) in FIG. 4, the terminals may be made of the same layer as the ITO layer. Similarly, the data line terminals shown in the data-line terminal section (H) in FIG. 4 and the scanning line terminals (not shown) may be made of the same material as the material (i.e., ITO) of the common electrode 26. In this case, the common electrode 26 can be formed by the same material as that of these terminal sections in question in the same process step as the terminal sections in question. This means that there is an additional advantage that the count of the necessary process steps for forming the common electrode 26 is prevented from increasing.

Since both of the common electrode 26 and the pixel electrodes 27 are formed on the second interlayer dielectric layer 25 in the LCD device 1 of the first embodiment, these electrodes 26 and 27 can be made of the same material in the same process step. This raises the fabrication efficiency of the LCD device 1.

If the second interlayer dielectric layer located between the common electrode 26 and the data lines 24 has a large ratio (d/∈) of the thickness d to the dielectric constant ∈, the parasitic capacitance between the data lines 24 and the common electrode 26 can be decreased.

As shown in FIGS. 1 and 3B, the pixel electrodes 26 and the common electrode 27, which are made of the transparent material, are partially wider in the overlapping areas with the underlying common electrode lines 26a and 26b and the underlying data lines 24 than their remainders, respectively. Thus, the local breaking or disconnection of the electrodes 26 and 27 can be avoided and as a result, high transmittance and high fabrication yield of the LCD device 1 of the first embodiment are obtainable as desired.

Subsequently, a method of fabricating the above-described LCD device 1 of the first embodiment is explained below with reference to FIGS. 5A to 5C and 6A to 6C each of which shows the same cross sections as those in FIG. 4.

First, as show in FIG. 5A, the Cr layer as the first metal layer is formed on the surface of the transparent glass plate 22 and then, it is patterned by photolithography and etching methods, thereby forming the gate electrodes 30c of the TFTs 30 and the scanning lines 28. Next, the first interlayer dielectric layer 23 is formed on the whole surface of the glass plate 22 in such a way as to cover the gate electrodes 30c and the scanning lines 28 thus formed. The layer 23 has a two-layer structure comprising a lower silicon dioxide ($SiO_2$) sublayer and an upper silicon nitride ($SiN_x$) sublayer.

Then, a non-doped amorphous Si (a-Si) layer 32 and a $n^+$-type a-Si layer 33 are successively formed on the first interlayer dielectric layer 23. The $n^+$-type a-Si layer 33 is heavily doped with an n-type dopant. The state at this stage is shown in FIG. 5A.

The a-Si layers 32 and 33 thus formed are patterned by photolithography and etching methods to form the a-Si inlands 41 of the TFTs 30, as shown in FIG. 5B. The islands 41 are made of the a-Si layers 32 and 33.

Thereafter, a Cr layer as the second metal layer is formed on the first interlayer dielectric layer 23 to cover the a-Si inlands 41. Then, the Cr layer thus formed is patterned by photolithography and etching methods, thereby forming the drain electrodes 30a and the source electrodes 30b of the TFTs 30, the data lines 24, and the pixel potential layers 42a and 42b, as shown in FIG. 5C. One of the pixel potential layers 42a and one of the potential layers 42b, which are apart from each other, are formed for each pixel.

In each pixel, as shown in FIG. 5C, the pixel potential layer 42a and the common electrode line 26a are located in such a way as to vertically sandwich the first interlayer dielectric layer 23. Similarly, the pixel potential layer 42b and the common electrode line 26b are located in such a way as to vertically sandwich the first interlayer dielectric layer 23. As clearly shown in FIG. 3A, the pixel potential layer 42a, which is placed near the gate electrode 30c of the said-stage TFT 30, is united with the source electrode 30b thereof. Unlike this, the pixel potential layer 42b, which is placed near the gate electrode 30c of the prior-stage TFT 30, is not united with the source electrode 30b thereof but isolated.

Figure 6A:
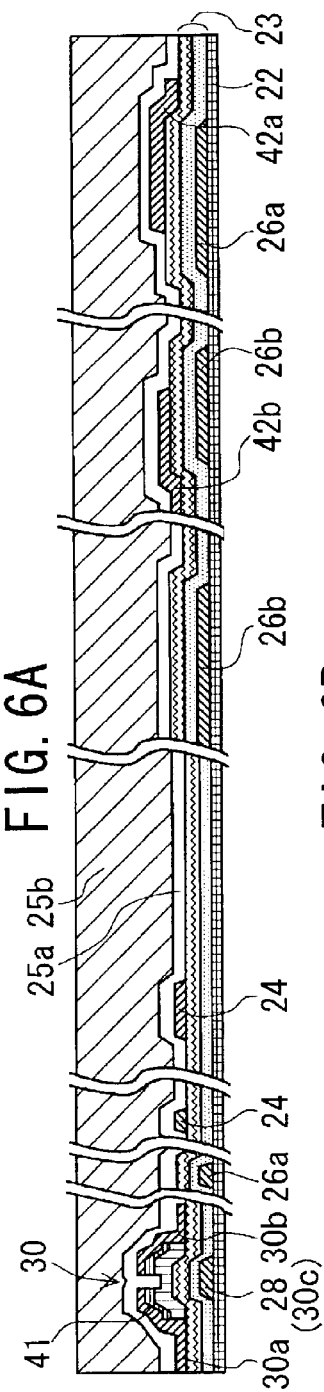
FIGS. 6A to 6C are partial, schematic cross-sectional views along the lines A–A', B–B', C–C', D–D', and E–E' in FIG. 1 and the cross-sectional views of the terminal sections G and H, respectively, which show the subsequent process steps to those of FIGS. 5A to 5C of the fabrication method of the LCD device according to the first embodiment of FIG. 1.

Subsequently, the a-Si islands 41 (i.e., the patterned a-Si layers 32 and 33) are selectively etched by using the drain and source electrodes 30a and 30b as a mask, thereby forming openings between the drain and source electrodes 30a and 30b, as shown in FIG. 6A. The bottoms of the openings reach the inside of the underlying a-Si layer 32. The openings do not penetrate the layer 32. Thus, the channel regions of the TFTs 30 are formed.

Figure 6B:
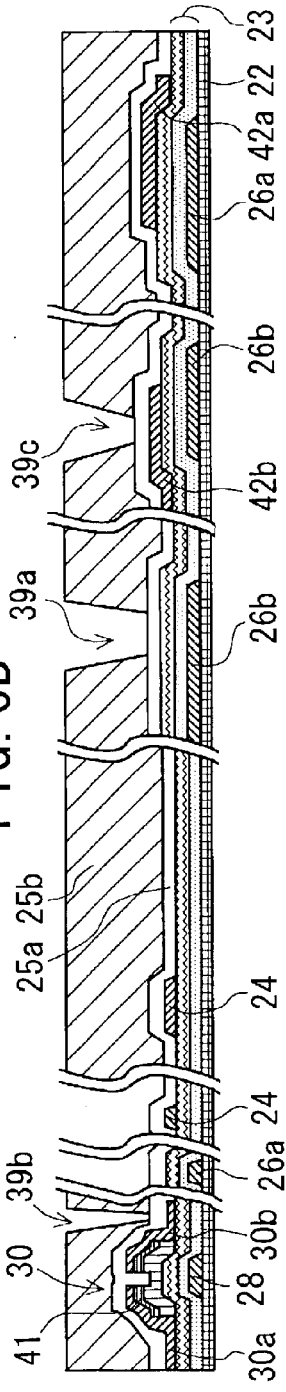
Figure 6C:
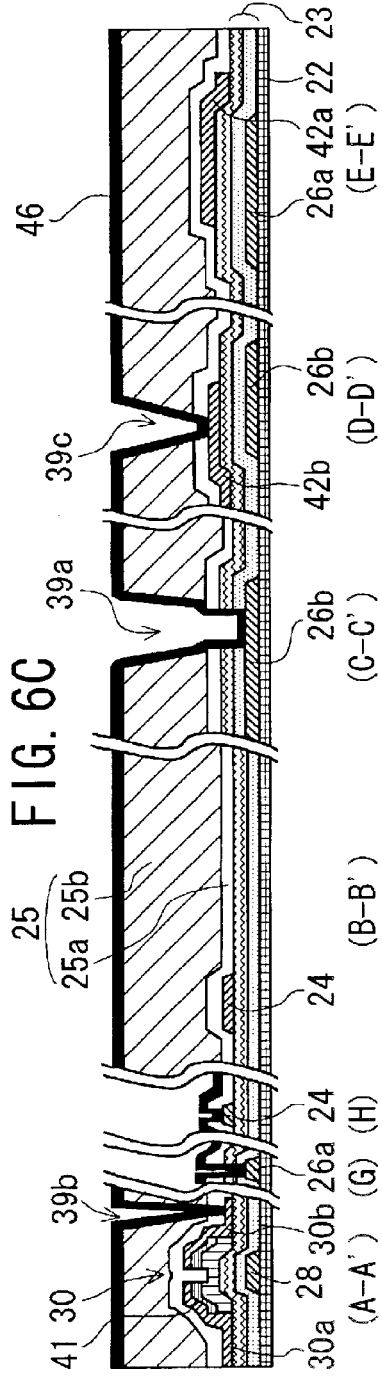

Thereafter, the first dielectric sublayer 25a made of $SiN_x$ (i.e., inorganic material) is deposited over the whole surface of the glass plate 22. On the $SiN_x$ sublayer 25a thus deposited, the second dielectric sublayer 25b made of photosensitive acrylic resin (i.e., organic material) is deposited. The inorganic first sublayer 25a is thin while the organic second sublayer 25b is very thick. Then, the photosensitive acrylic resin sublayer 25b is selectively exposed using a mask (not shown), developed, and sintered, thereby forming the contact holes 39a, 39b, and 39c, as shown in FIG. 6B.

The contact holes 39b, which are located above the source electrodes 30b placed near the said-stage gate electrodes 30c and which are used for the pixel electrodes 27, expose the lower $SiN_x$ sublayer 25a of the second interlayer dielectric layer 25. The contact holes 39c, which are located near the prior-stage gate electrodes 30c and which are used for the pixel electrodes 27, expose the lower $SiN_x$ sublayer 25a of the second interlayer dielectric layer 25. The contact holes 39a, which are located above the common electrode lines 26b and which are used for the same lines 26b, expose the lower $SiN_x$ sublayer 25a of the second interlayer dielectric layer 25.

Following this process step, by way of the contact holes 39b and 39c for the pixel electrodes 27 and the contact holes 39a for the common electrode 26, the exposed $SiN_x$ sublayer 25a of the second interlayer dielectric layer 25 is selectively etched. Further, the underlying first interlayer dielectric layer 23 is selectively etched by way of the holes 39a. Thus, the holes 39b expose the source electrodes 30b, the holes 39c expose the pixel potential layers 42a or 42b, and the holes 39a expose the common electrode lines 26a or 26b.

The ITO layer 46 is then deposited over the whole glass plate 22 to cover the contact holes 39a, 39b, and 39c. Thus, the inner faces of these holes 39a, 39b, and 39c are covered with the ITO layer 46. The ITO layer 46 is then patterned by photolithography and etching methods, thereby forming the common electrode 26 and the pixel electrode 27 for each pixel. In this way, the active element substrate 11 is completed.

In this substrate 11 thus completed, the first storage capacitor using the pixel potential layer 42a is provided near the said-stage gate electrode 30c and at the same time, the second storage capacitor using the pixel potential layer 42b is provided near the prior-stage gate electrode 30c in each pixel. The pixel potential layer 42a is electrically connected to the pixel potential layer 42b by way of the transparent pixel electrode 27 and thus, the first and second storage capacitors for each pixel are electrically connected in parallel to each other.

On the other hand, the opposite substrate 12 is fabricated in the following way.

Specifically, the light-shielding layer or black matrix 17, the color layer 18, and the overcoat layer or planarization layer 19 are selectively and successively formed on the inner surface of the second transparent glass plate 16 to have their specific patterns, as shown in FIG. 2. On the outer surface of the plate 16, the transparent, conductive layer (e.g., an ITO layer) 15 is formed by a sputtering method. This is to prevent unevenness in displayed images due to charge-up caused by hand-touch of the user to the LCD panel of the LCD device 1.

The active element substrate 11 and the opposite substrate 12 thus fabricated are then coupled to each other in such a way as to form a specific gap with spacers (not shown). A nematic liquid crystal is filled into the gap and then, the gap is sealed, thereby forming the liquid crystal layer 13 between the substrates 11 and 12. Thus, the liquid crystal panel is completed. The nematic liquid crystal used here has a dielectric constant anisotropy $\Delta \in$ of +8 (at 589 nm and 20° C.), a refractive index anisotropy $\Delta n$ of 0.075, and a specific resistance or resistivity of $1.5 \times 10^{12}$ $\Omega \cdot cm$. The thickness of the liquid crystal layer 13 (i.e., cell gap) is set at 4.0 $\mu m$.

On the inner surfaces of the substrates 11 and 12, the alignment layers 31 and 20 are respectively formed by the offset printing method or the like. The layers 31 and 20 are rubbed by a known rubbing method in the direction shown by the arrow in FIG. 1 in order to align the liquid crystal molecules. Thus, the liquid crystal molecules will be initially aligned at 15° with respect to the widthwise direction of the comb-teeth-shaped pixel and common electrodes 27 and 26.

Finally, the polarizer plates 21 and 14 are fixed onto the outer surfaces of the substrates 11 and 12, respectively.

The inventors actually fabricated the LCD device 1 according to the first embodiment in the same way as explained above. Thereafter, the intensity of light penetrating through the liquid crystal layer 13 (i.e., the LCD panel) was controlled by changing the alignment state of the liquid crystal molecules existing in the layer 13 with the external signal voltages, thereby displaying images in gray scales in the "normally black display mode". In the "normally black display mode", "black" is displayed when no voltage is applied across all the pixel electrodes 27 and the common electrode 26. "White" is displayed when proper signal voltages are applied across all the pixel electrodes 27 and the common 26 to generate electric field approximately in parallel to the substrates 11 and 12 in the liquid crystal layer 13. Thus, when "white" is displayed, the liquid crystal molecules in the layer 13 are rotated at an approximately 45° from their initial alignment angle to thereby maximize the intensity of the light penetrating through the LCD panel.

Thereafter, the LCD device 1 thus fabricated was built in a driver unit and operated with the use of the same unit. As a result, it was confirmed that the LCD device 1 of the first embodiment operated as an IPS-type LCD device with a higher transmittance than the prior-art LCD devices.

Second Embodiment

FIGS. 7 and 8 and FIGS. 9A and 9B show an IPS mode active-matrix addressing LCD device 2 according to a second embodiment of the invention.

Figure 7:
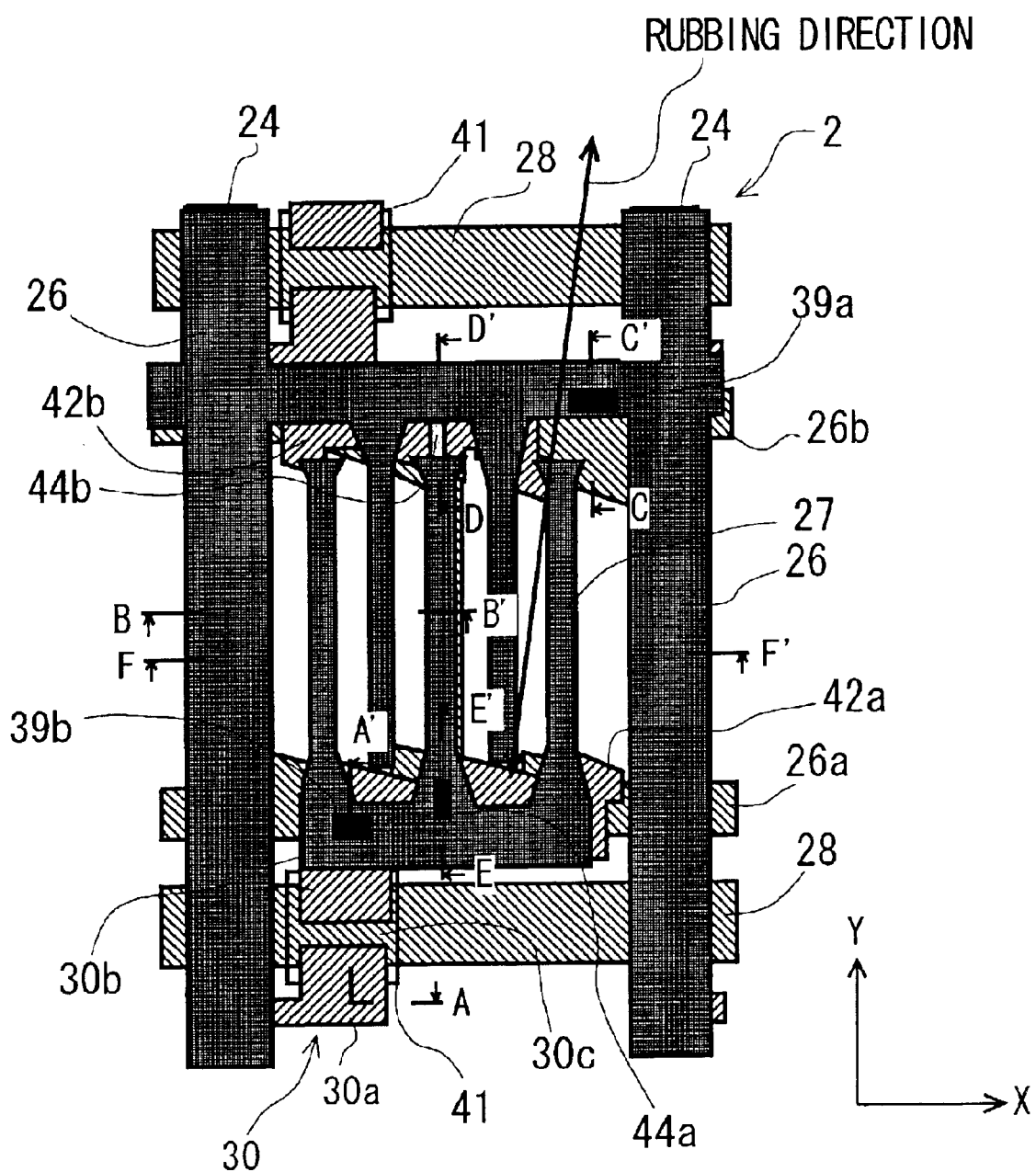
FIG. 7 is a schematic plan view showing the layout of the active element substrate of an IPS mode active-matrix addressing LCD device according to a second embodiment of the invention.
Figure 8:
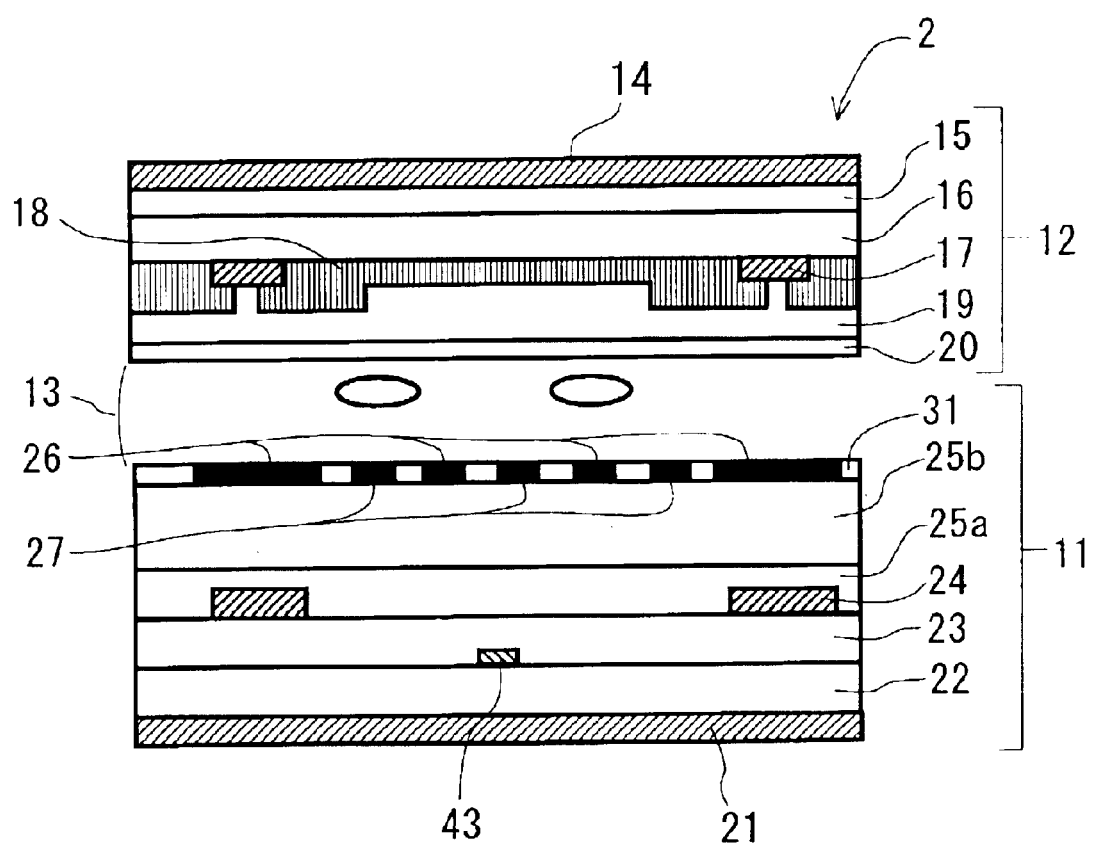
FIG. 8 is a partial, schematic cross-sectional view along the line F–F' in FIG. 7.
Figure 9A:
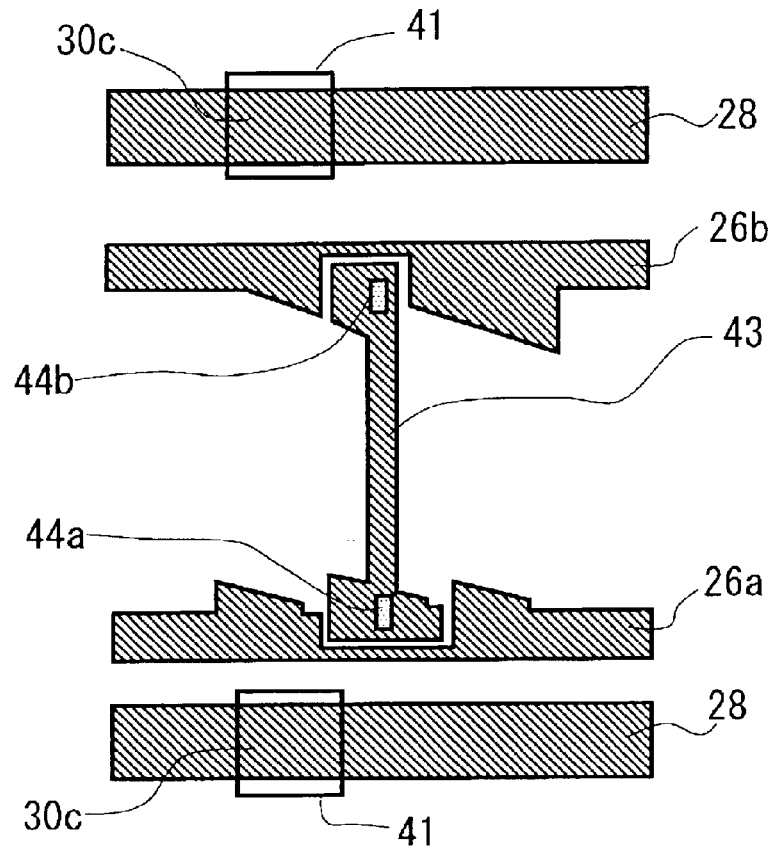
FIG. 9A is a schematic plan view showing the layout of the conductive layers lower than the data line layer of the LCD device according to the second embodiment of FIG. 7.
Figure 9B:
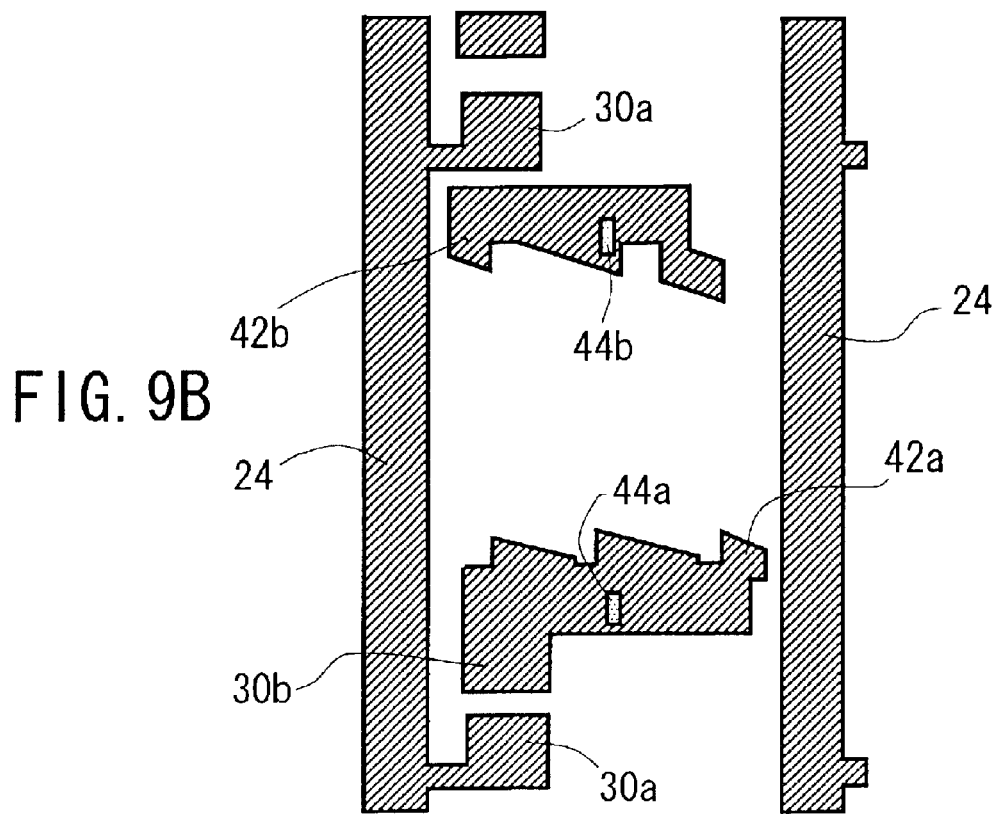
FIG. 9B is a schematic plan view showing the layout of the data line layer of the LCD device according to the second embodiment of FIG. 7.

FIG. 7 shows a plan view of the active element substrate. FIG. 8 shows the cross-sectional view along the line F–F' in FIG. 7. FIGS. 9A and 9B show the layout of the patterns of the layers lower than the data lines, and the layout of the layer of the data lines, respectively. In these figures, the same reference numerals or symbols are attached to the same elements as shown in the LCD device 1 according to the above-described first embodiment. Thus, the explanation about the same elements is omitted here for the sake of simplification of description.

Comparing the LCD device 2 of the second embodiment with that of the first embodiment, the configuration of the second embodiment is the same as that of the first embodiment with respect to the active element substrate 11, except for the structure to electrically interconnect the pixel potential layer 42a near the said-stage gate electrode 30c and the pixel potential layer 42b near the prior-stage gate electrode 30c with each other in each pixel.

Specifically, with the LCD device 1 of the first embodiment, the pixel potential layers 42a and 42b are electrically interconnected to each other by way of the transparent pixel electrode 27. Unlike this, with the LCD device 2 of the second embodiment, the pixel potential layers 42a and 42b are electrically interconnected to each other by way of an interconnection electrode 43 made of the same opaque, conductive material as that of the scanning lines 28, as shown in FIGS. 8 and 9. The opposite substrate 12 is the same in configuration as that of the first embodiment.

Next, a method of fabricating the LCD device 2 of the second embodiment is explained below with reference to FIGS. 10A to 10C.

First, in the step of FIG. 5A in the first embodiment, where the Cr layer is patterned by photolithography and dry etching methods to form the gate electrodes 30c, the scanning lines 28, and the common electrode lines 26a and 26b on the glass plate 22, the interconnection electrodes 43 are formed on the plate 22 with the same Cr layer, as shown in FIG. 10A. The electrodes 43 have an approximately linear plan shape, as shown in FIG. 9A.

Next, in the same way as the steps of FIGS. 5A to 5C, the first interlayer dielectric layer 23, which has a two-layer structure comprising a $SiO_2$ sublayer and a $SiN_x$ sublayer, is formed over the whole glass plate 22 and then, the a-Si islands 41 of the TFTs 30 are formed on the layer 23.

Subsequently, as shown in FIG. 10B, the first interlayer dielectric layer 23 is selectively etched to form the contact holes 44a and 44b penetrating the first interlayer dielectric layer 23 to expose the underlying interconnection electrodes 43 (which are formed by the first metal layer), as shown in FIGS. 9A and 10B. Then, the Cr layer (i.e., the second metal layer) is deposited over the whole glass plate 22 and patterned by photolithography and dry etching methods, thereby forming the drain and source electrodes 30a and 30b of the TFT 30, the data lines 24, and the pixel electrode layers 42a and 42b. One of the pixel potential layers 42a and one of the potential layers 42b, which are apart from each other, are formed for each pixel.

In each pixel, as shown in FIG. 10B, the pixel potential layer 42a is located to overlap with the interconnection electrode 43 and to contact the same electrode 43 by way of the contact hole 44a. Similarly, the pixel potential layer 42b is located to overlap with the interconnection electrode 43 and to contact the same electrode 43 by way of the contact hole 44b. The state at this stage is shown in FIG. 10B.

As clearly shown in FIG. 9B, the pixel potential layer 42a, which is placed near the gate electrode 30c of the said-stage TFT 30, is united with the source electrode 30b thereof. Unlike this, the pixel potential layer 42b, which is placed near the gate electrode 30c of the prior-stage TFT 30, is not united with the source electrode 30b thereof but isolated.

Subsequently, as shown in FIG. 10C, the a-Si islands 41 are selectively etched by using the drain and source electrodes 30a and 30b as a mask, thereby forming openings between the drain and source electrodes 30a and 30b. The bottoms of the openings reach the inside of the underlying a-Si layer 32. The openings do not penetrate the layer 32. Thus, the channels of the TFTs 30 are formed. Thereafter, the first dielectric sublayer 25a made of $SiN_x$ is deposited over the whole surface of the glass plate 22. On the $SiN_x$ sublayer 25a, the second dielectric sublayer 25b made of photosensitive acrylic resin is deposited. The inorganic first sublayer 25a is thin while the organic second sublayer 25b is very thick. Then, the photosensitive acrylic resin sublayer 25b is selectively exposed using a mask (not shown), developed, and sintered, forming the contact holes 39a and 39b, as shown in FIG. 10C.

The contact holes 39b, which are located above the source electrodes 30b placed near the said-stage gate electrodes 30c and which are used for the pixel electrodes 27, expose the lower $SiN_x$ sublayer 25a of the second interlayer dielectric layer 25. The contact holes 39a, which are located above the common electrode lines 26b and which are used for the same lines 26b, expose the lower $SiN_x$ sublayer 25a of the second interlayer dielectric layer 25.

Following this, byway of the contact holes 39b for the pixel electrodes 27 and the contact holes 39a for the common electrode lines 26a and 26b, the exposed $SiN_x$ sublayer 25a of the second interlayer dielectric layer 25 is selectively etched. Further, the underlying first interlayer dielectric layer 23 is selectively etched by way of the holes 39a. Thus, the holes 39b expose the source electrodes 30b, and the holes 39a expose the common electrode lines 26a or 26b.

Then, the ITO layer 46 is deposited over the whole glass plate 22 to cover the contact holes 39a and 39b. Thus, the inner faces of these holes 39a and 39b are covered with the ITO layer 46. The ITO layer 46 is then patterned by photolithography and etching methods, thereby forming the common electrode 26 and the pixel electrode 27 for each pixel. In this way, the active element substrate 11 is completed.

In this substrate 11 thus completed, the first storage capacitor using the pixel potential layer 42a is provided near the said-stage gate electrode 30c and at the same time, the second storage capacitor using the pixel potential layer 42b is provided near the prior-stage gate electrode 30c in each pixel. The pixel potential layer 42a is electrically connected to the pixel potential layer 42b by way of the opaque interconnection electrode 43 and the contact holes 44a and 44b and therefore, the first and second storage capacitors are electrically connected in parallel to each other in each pixel.

In the same way as the first embodiment, the active element substrate 11 and the opposite substrate 12 thus fabricated are then coupled to each other in such a way as to form the liquid crystal layer 13 including a nematic liquid crystal, resulting in the LCD panel.

The inventors actually fabricated the LCD device 2 according to the second embodiment in the same way as explained above. Thereafter, the intensity of light penetrating through the liquid crystal layer 13 (i.e., the LCD panel) was controlled by changing the alignment state of the liquid crystal molecules existing in the layer 13 with the external signal voltages, thereby displaying images in gray scales in the "normally black display mode". In the "normally black display mode", "black" is displayed when no voltage is applied across the pixel electrodes 27 and the common electrodes 26. "White" is displayed when proper signal voltages are applied across the electrodes 27 and 26 to generate electric field approximately in parallel to the substrate 11 and 12 in the liquid crystal layer 13. Thus, when "white" is displayed, the liquid crystal molecules in the layer 13 are rotated at an approximately 45° from their initial alignment angle to thereby maximize the intensity of the light that has penetrated through the panel.

Thereafter, the LCD device 2 thus fabricated was built in a driver unit and operated with the use of the unit. As a result, it was confirmed that the LCD device 2 of the second embodiment operated as an IPS-type LCD device with a higher transmittance than the prior-art LCD devices.

In particular, with the LCD device 2 of the second embodiment, the pixel potential layer 42a located near the said-stage gate electrode 30c and the pixel potential layer 42b located near the prior-stage gate electrode 30c are electrically connected to each other by way of the interconnection electrode 43 in each pixel. The electrode 43 is formed by the opaque Cr layer for forming the common electrode lines 26a and 26b, the scanning lines 28, and the gate electrodes 30c, where the Cr layer is placed farthest from the liquid crystal layer 13 within the device 2. Therefore, the penetrating light is undesirably blocked by the interconnection electrode 43. However, the electrode 43 is in the lowest level and sufficiently apart from the layer 13. Thus, the electrode 43 will apply very weak electric field to the liquid crystal molecules in the layer 13. This means that electric field fluctuation for the respective columns in each pixel will be small. In other words, the electrode 43 does not affect badly the obtainable transmittance.

Additionally, with the LCD device 2 of the second embodiment, the interconnection electrodes 43 are formed by the same layer as the common electrode lines 26a and 26b and the scanning lines 28. However, the invention is not limited to this. If the common electrode lines 26a and 26b are formed by a conductive layer different from that of the scanning lines 28, it is preferred that the interconnection electrodes 43 are formed by the layer located farthest from the liquid crystal layer 13.

Third Embodiment

FIGS. 11 and 12 and FIGS. 13A and 13B show an IPS mode active-matrix addressing LCD device 3 according to a third embodiment of the invention.

Figure 11:
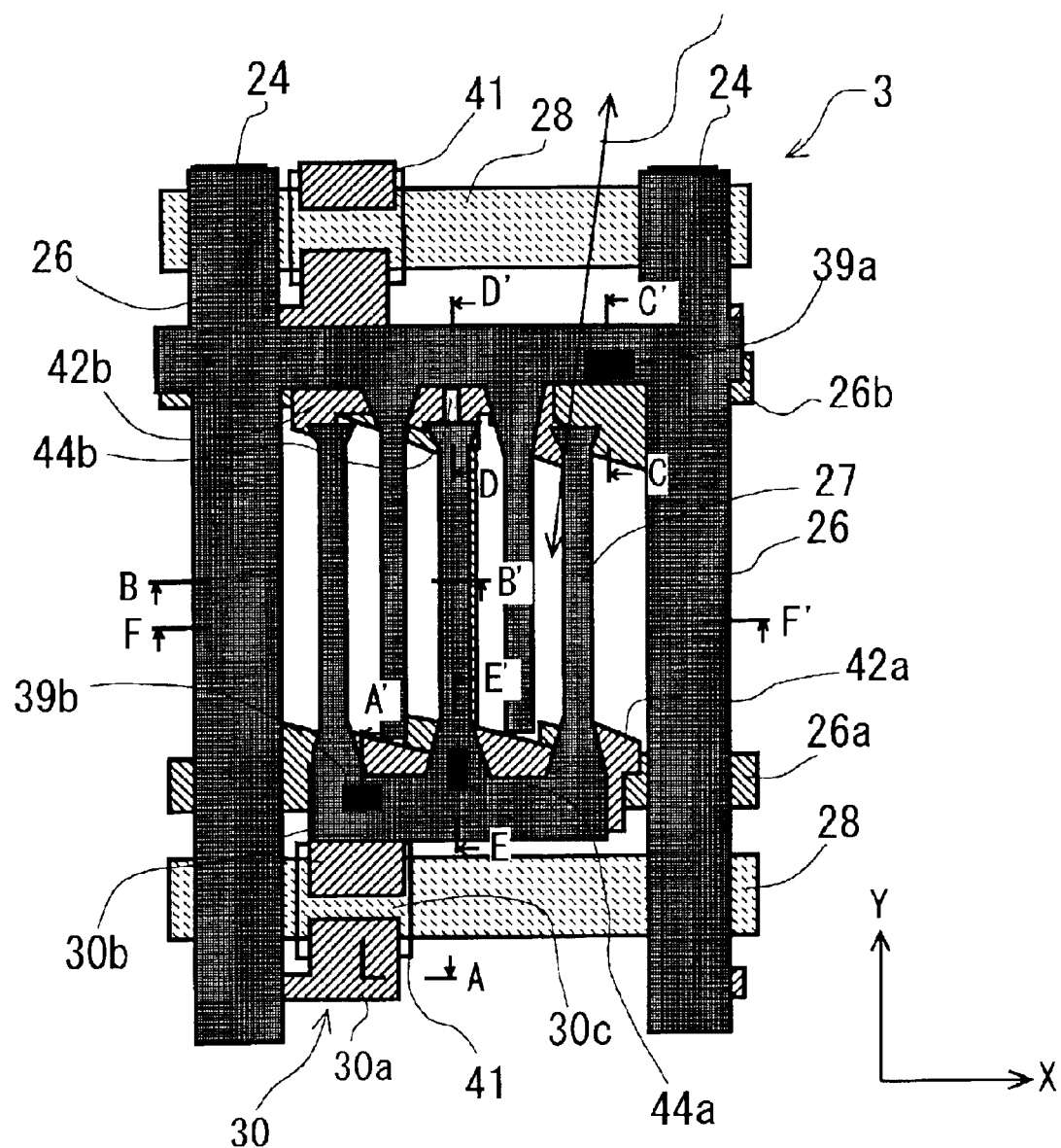
FIG. 11 is a schematic plan view showing the layout of the active element substrate of an IPS mode active-matrix addressing LCD device according to a third embodiment of the invention.
Figure 12:
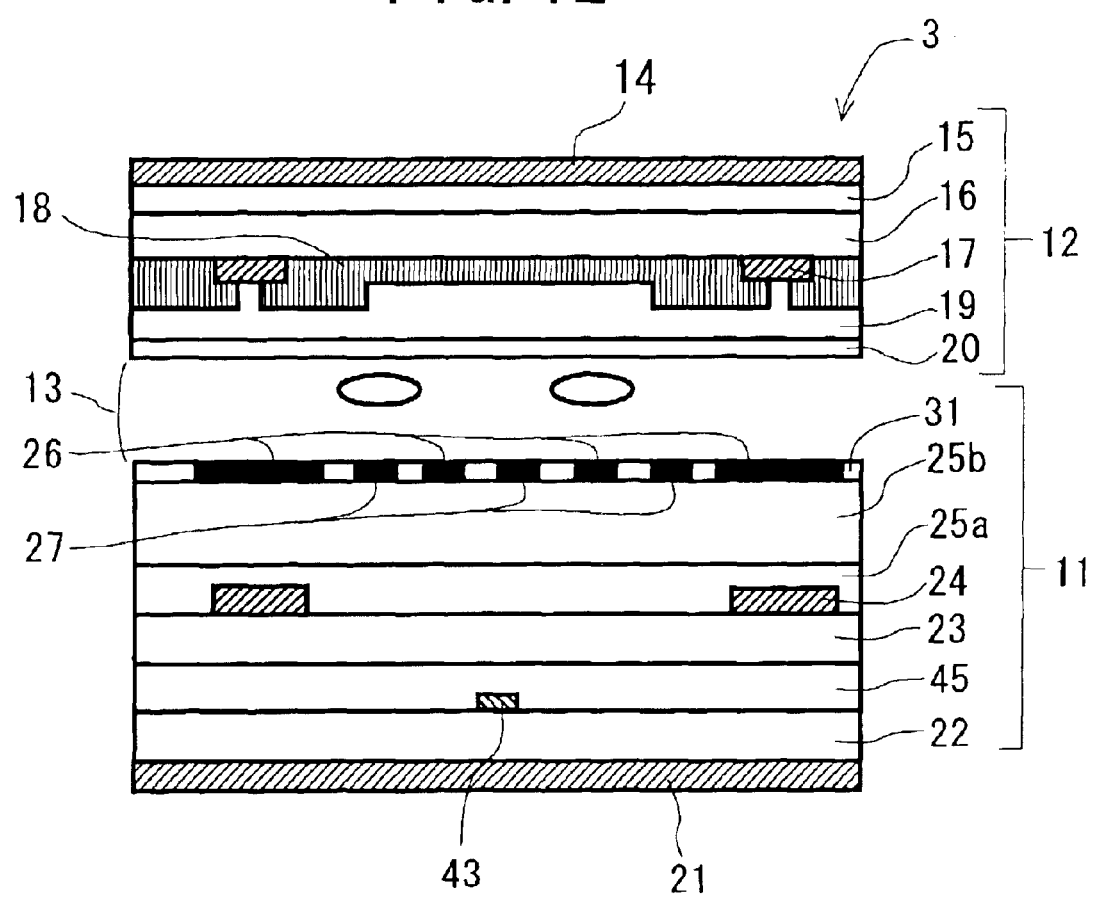
FIG. 12 is a partial, schematic cross-sectional view along the line F–F' in FIG. 11.
Figure 13A:
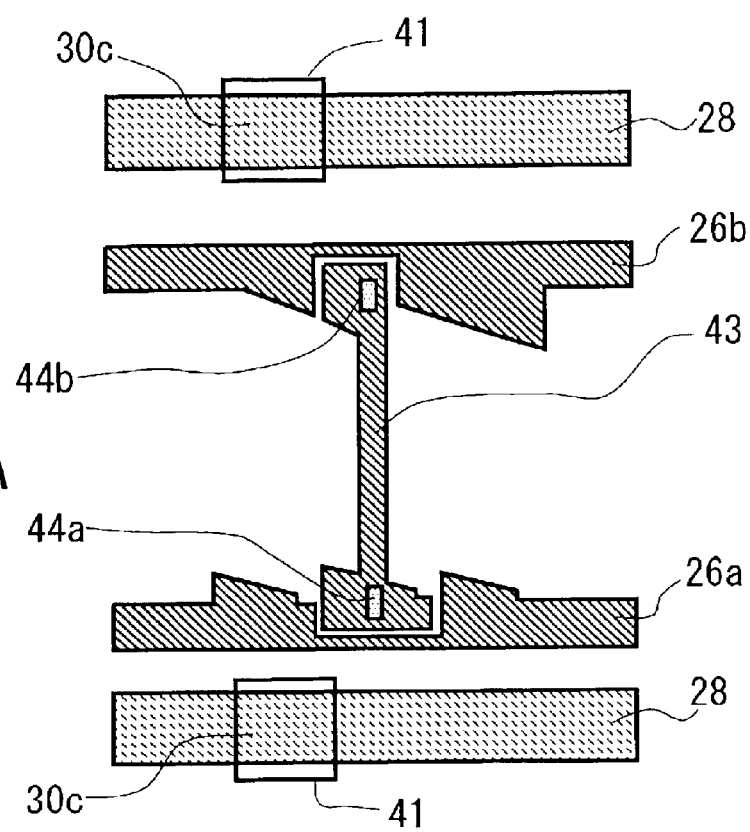
FIG. 13A is a schematic plan view showing the layout of the conductive layers lower than the data line layer of the LCD device according to the third embodiment of FIG. 11.
Figure 13B:
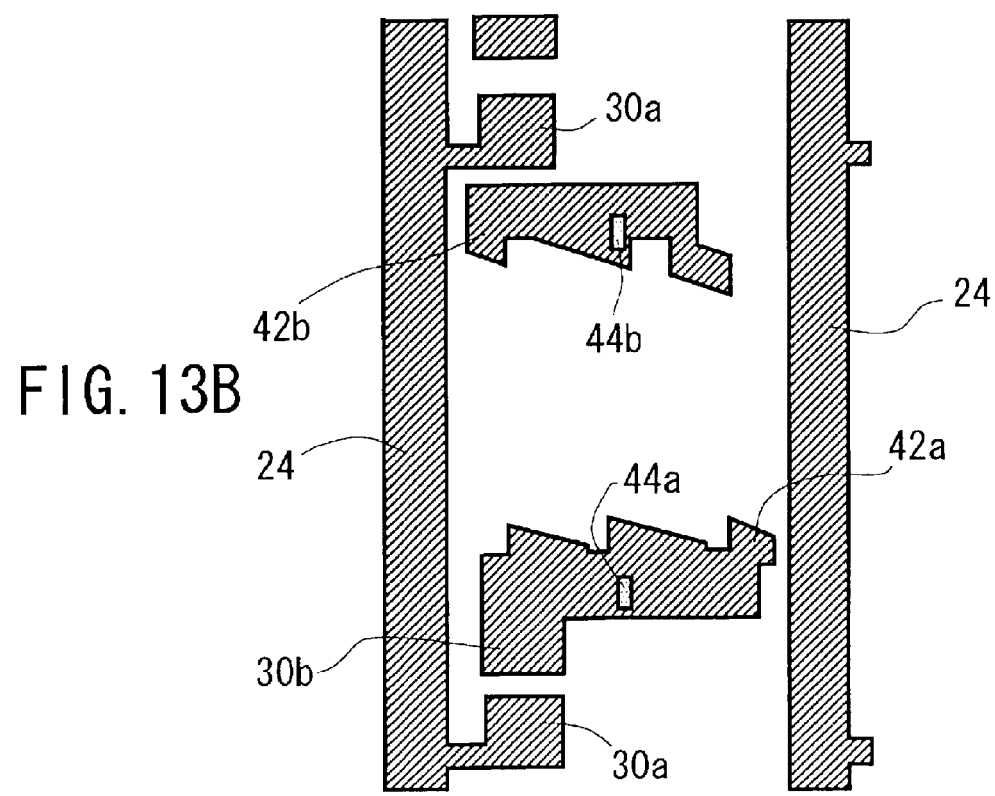
FIG. 13B is a schematic plan view showing the layout of the data line layer of the LCD device according to the third embodiment of FIG. 11.

FIG. 11 shows a plan view of the active element substrate. FIG. 12 shows the cross-sectional view along the line F–F' in FIG. 11. FIGS. 13A and 13B show the layout of the patterns of the layers lower than the data lines, and the layout of the layer of the data lines, respectively. In these figures, the same reference numerals or symbols are attached to the same elements as shown in the LCD device 1 according to the above-described first embodiment. Thus, the explanation about the same elements is omitted here for the sake of simplification of description.

Comparing the LCD device 3 of the third embodiment with that of the second embodiment, the configuration of the third embodiment is the same as that of the second embodiment with respect to the active element substrate 11, except for the structure to electrically interconnect the pixel potential layer 42a near the said-stage gate electrode 30c and the pixel potential layer 42b near the prior-stage gate electrode 30c with each other in each pixel.

Specifically, with the LCD device 2 of the above-described second embodiment, the pixel potential layers 42a and 42b are electrically interconnected to each other by way of the interconnection electrode 43 formed by the opaque first metal layer for forming the common electrode lines 26a and 26b and the scanning lines 28. Unlike this, with the LCD device 3 of the third embodiment, the scanning lines 28 are formed by a different conductive layer from that for the common electrode lines 26a and 26b and at the same time, the interconnection electrode 43 is formed by the layer for the common electrode lines 26a and 26b. The opposite substrate 12 is the same in configuration as the first and second embodiments.

Next, a method of fabricating the LCD device 3 of the third embodiment is explained below with reference to FIG. 14.

First, in the same way as the step of FIG. 5A, the Cr layer, which is formed on the glass plate 22, is patterned by photolithography and dry etching methods to form the common electrode lines 26a and 26b and the interconnection electrodes 43. The electrodes 43 have an approximately linear plan shape, as shown in FIG. 13A.

Next, a third interlayer dielectric layer 45, which is made of $SiN_x$, is formed on the whole plate 22 to cover the common electrode lines 26a and 26b and the interconnection electrodes 43. Then, a third metal layer, which is made of Cr, is formed on the third interlayer dielectric layer 45. The third metal layer is then patterned by photolithography and dry etching methods, thereby forming the scanning lines 28. The first interlayer dielectric layer 23, which is used in the first and second embodiments, is then formed on the third interlayer dielectric layer 45.

Thereafter, the a-Si layer 32 and the $n^+$-type a-Si layer 33 are successively formed on the first interlayer dielectric layer 23. The a-Si layers 32 and 33 are patterned by photolithography and etching methods to form the a-Si islands 41 of the TFTs 30 on the layer 23. Subsequently, the first and third interlayer dielectric layers 23 and 45 are simultaneously and selectively etched to form the contact holes 44a and 44b penetrating the first and third interlayer dielectric layers 23 and 45 to expose the underlying interconnection electrodes 43 (which are formed by the first metal layer). The contact holes 44a and 44b are for the interconnection electrodes 43.

Subsequently, the Cr layer (i.e., the second metal layer) is deposited over the whole glass plate 22 and patterned by photolithography and dry etching methods, thereby forming the drain and source electrodes 30a and 30b of the TFTs 30, the data lines 24, and the pixel potential layers 42a and 42b. One of the pixel potential layers 42a and one of the pixel potential layers 42b, which are apart from each other, are formed for each pixel. In each pixel, as shown in FIGS. 13A and 13B, the pixel potential layer 42a is located to overlap with the interconnection electrode 43 and to contact the same electrode 43 by way of the contact hole 44a. Similarly, the pixel potential layer 42b is located to overlap with the interconnection electrode 43 and to contact the same electrode 43 by way of the contact hole 44b.

As clearly shown in FIG. 13B, the pixel potential layer 42a, which is placed near the gate electrode 30c of the said-stage TFT 30, is united with the source electrode 30b thereof. Unlike this, the pixel potential layer 42b, which is placed near the gate electrode 30c of the prior-stage TFT 30, is not united with the source electrode 30b thereof but isolated.

The following process steps are the same as the second embodiment.

Specifically, the a-Si islands 41 are selectively etched by using the drain and source electrodes 30a and 30b as a mask, thereby forming openings between the drain and source electrodes 30a and 30b. The bottoms of the openings reach the inside of the underlying a-Si layer 32. The openings do not penetrate the layer 32. Thus, the channels of the TFTs 30 are formed. Thereafter, the first dielectric sublayer 25a made of $SiN_x$ is deposited over the whole surface of the glass plate 22. On the $SiN_x$ sublayer 25a, the second dielectric sublayer 25b made of photosensitive acrylic resin is deposited. The inorganic first sublayer 25a is thin while the organic second sublayer 25b is very thick. Then, the photosensitive acrylic resin sublayer 25b is selectively exposed using a mask (not shown), developed, and sintered, thereby forming the contact holes 39a and 39b. The contact holes 39b, which are located above the source electrodes 30b placed near the said-stage gate electrodes 30c and which are used for the pixel electrodes 27, expose the lower $SiN_x$ sublayer 25a of the second interlayer dielectric layer 25. The contact holes 39a, which are located above the common electrode lines 26b and which are used for the same lines 26b, expose the lower $SiN_x$ sublayer 25a of the second interlayer dielectric layer 25.

Following this process step, by way of the contact holes 39b for the pixel electrodes 27 and the contact holes 39a for the common electrode lines 26a and 26b, the exposed $SiN_x$ sublayer 25a of the second interlayer dielectric layer 25 is selectively etched. Further, the underlying first interlayer dielectric layer 23 is selectively etched by way of the holes 39a. Thus, the holes 39b expose the source electrodes 30b, and the holes 39a expose the common electrode lines 26a or 26b.

Subsequently, the ITO layer 46 is deposited over the whole glass plate 22 to cover the contact holes 39a and 39b. Thus, the inner faces of these holes 39a and 39b are covered with the ITO layer 46. The ITO layer 46 is then patterned by photolithography and etching methods, thereby forming the common electrode 26 and the pixel electrode 27 for each pixel. In this way, the active element substrate 11 is completed.

In this substrate 11 thus completed, the first storage capacitor using the pixel potential layer 42a is provided near the said-stage gate electrode 30c and at the same time, the second storage capacitor using the pixel potential layer 42b is provided near the prior-stage gate electrode 30c in each pixel. The pixel potential layer 42a is electrically connected to the pixel potential layer 42b by way of the opaque interconnection electrode 43 and the contact holes 44a and 44b and therefore, the first and second storage capacitors are electrically connected in parallel to each other. The interconnection electrodes 43 are formed by the same opaque metal layer as the common electrode lines 26a and 26b, where the metal layer in question is located furthest from the liquid crystal layer 13.

In the same way as the first embodiment, the active element substrate 11 and the opposite substrate 12 thus fabricated are then coupled to each other in such a way as to form the liquid crystal layer 13 including a nematic liquid crystal, resulting in the LCD panel.

The inventors actually fabricated the LCD device 3 according to the third embodiment in the same way as explained above. Thereafter, the intensity of light penetrating through the liquid crystal layer 13 (i.e., the LCD panel) was controlled by changing the alignment state of the liquid crystal molecules existing in the layer 13 with the external signal voltages, thereby displaying images in gray scales in the "normally black display mode". Thereafter, the LCD device 3 thus fabricated was built in a driver unit and operated with the use of the unit. As a result, it was confirmed that the LCD device 3 of the third embodiment operated as an IPS-type LCD device with a higher transmittance than the prior-art LCD devices.

With the LCD device 3 of the third embodiment, the first storage capacitor using the pixel potential layer 42a is provided near the said-stage gate electrode 30c and at the same time, the second storage capacitor using the pixel potential layer 42b is provided near the prior-stage gate electrode 30c in each pixel. The pixel potential layer 42a is electrically connected to the pixel potential layer 42b by way of the opaque interconnection electrode 43 and the contact holes 44a and 44b and thus, the first and second storage capacitors are electrically connected in parallel to each other. The interconnection electrodes 43 are formed by the same opaque metal layer as the common electrode lines 26a and 26b, where the metal layer in question is located furthest from the liquid crystal layer 13. Therefore, the penetrating light is undesirably blocked by the interconnection electrodes 43. However, the electrodes 43 are in the lowest level and sufficiently apart from the layer 13. Thus, the electrodes 43 will apply very weak electric field to the liquid crystal in the layer 13, which means that electric field fluctuation for the respective columns will be small. In other words, the electrodes 43 do not affect badly the obtainable transmittance.

Fourth Embodiment

Figure 15:
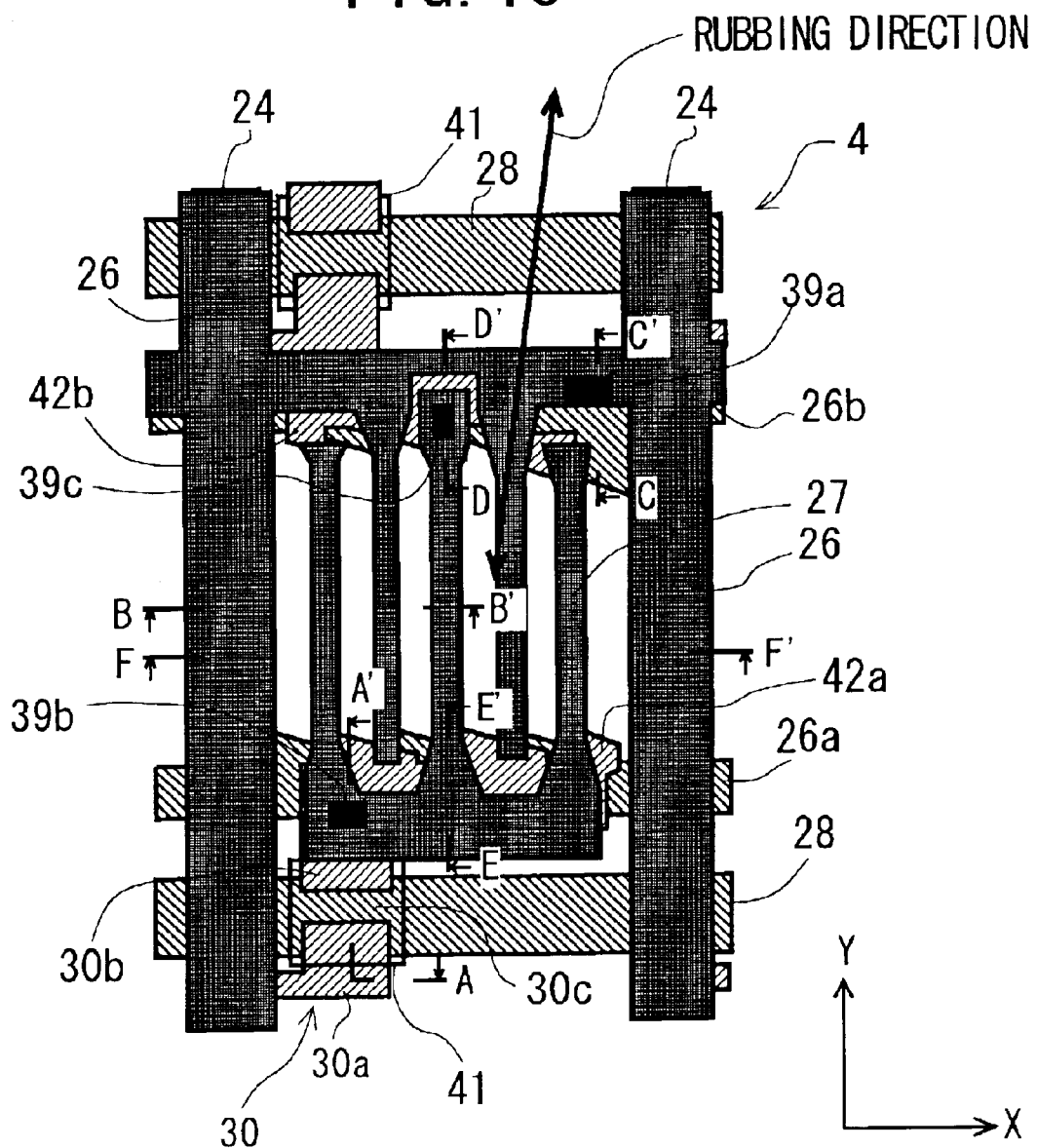
FIG. 15 is a schematic plan view showing the layout of the active element substrate of an IPS mode active-matrix addressing LCD device according to a fourth embodiment of the invention.
Figure 16:
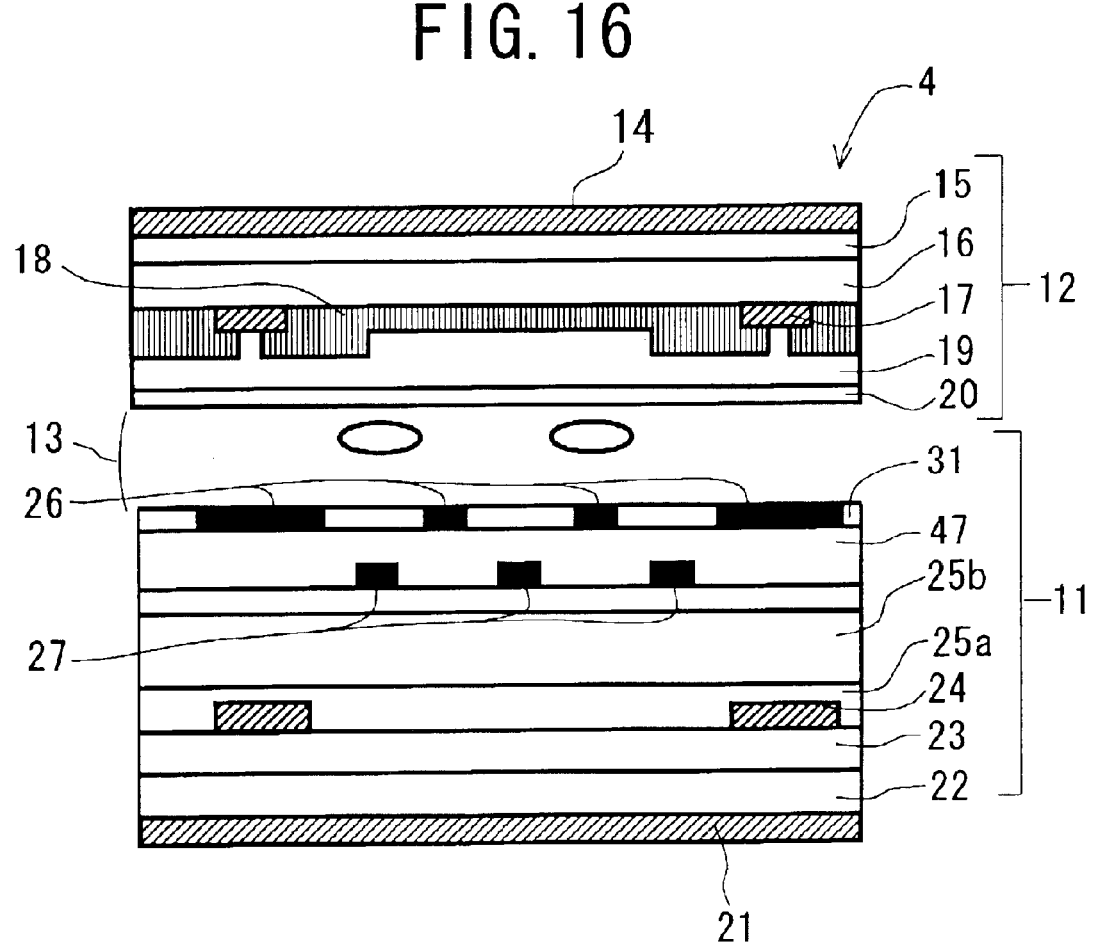
FIG. 16 is a partial, schematic cross-sectional view along the line F–F' in FIG. 15.
Figure 17:
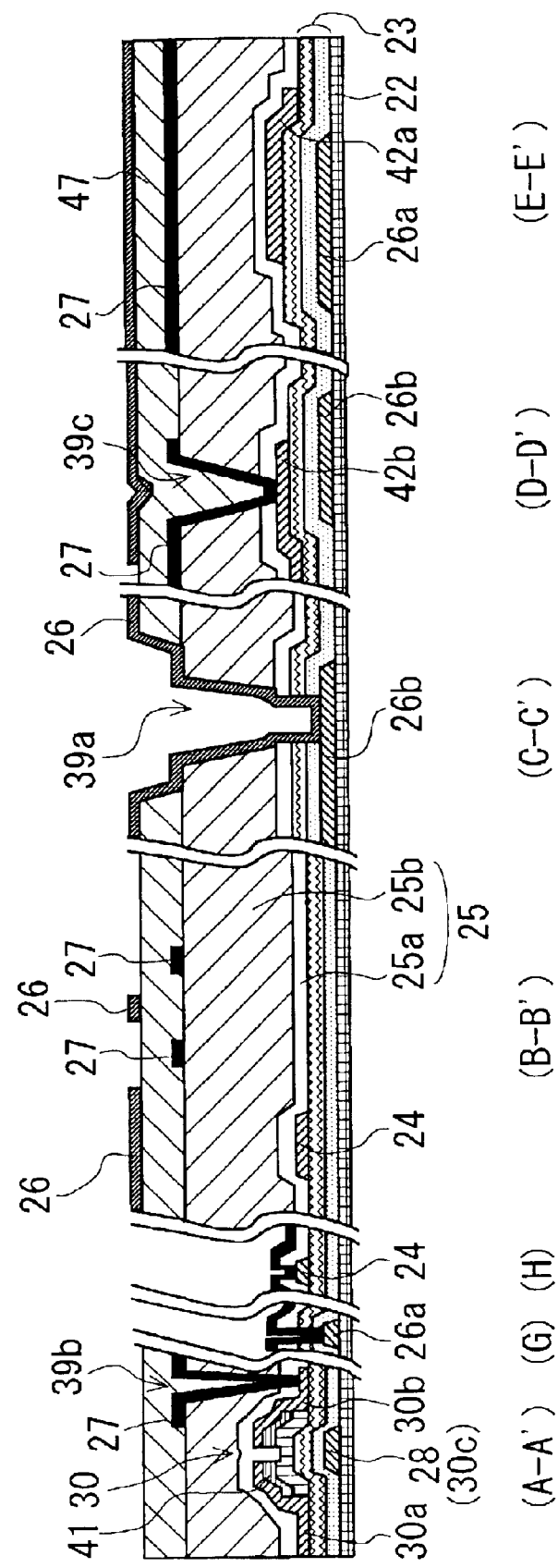
FIG. 17 is partial, schematic cross-sectional views along the lines A–A', B–B', C–C', D–D', and E–E' in FIG. 15 and the cross-sectional views of the terminal sections G and H, which are shown in a lump in a single figure and which are separated from each other by curved lines.

FIGS. 15, 16 and 17 show an IPS mode active-matrix addressing LCD device 4 according to a fourth embodiment of the invention.

FIG. 15 shows a plan view of the active element substrate. FIG. 16 shows the cross-sectional view along the line F–F' in FIG. 15. In these figures, the same reference numerals or symbols are attached to the same elements as shown in the LCD device 1 according to the above-described first embodiment. Thus, the explanation about the same elements is omitted here for the sake of simplification of description.

Comparing the device 4 of the fourth embodiment with that of the above-described first embodiment, the configuration of the fourth embodiment is the same as that of the first embodiment with respect to the active element substrate 11, except for the structures of the pixel electrodes 27 and the common electrodes 26.

Specifically, with the LCD device 4 of the fourth embodiment, like the first embodiment, the pixel potential layers 42a and 42b are electrically interconnected with each other by way of the interconnection electrode 43 formed by the transparent pixel electrode 27 in each pixel. However, unlike the first embodiment, the pixel electrodes 27 are formed on the second interlayer dielectric layer 25 and at the same time, the common electrodes 26 are formed on a fourth interlayer dielectric layer 47 covering the pixel electrodes 27. The opposite substrate 12 is the same in configuration as the first and second embodiments.

Next, a method of fabricating the LCD device 4 of the fourth embodiment is explained below with reference to FIG. 17.

In the method of the LCD device 4 of the fourth embodiment, first, the same process steps as shown in FIGS. 5A to FIG. 6B in the first embodiment are carried out. Thereafter, the second interlayer dielectric layer 25 is formed to cover the source and drain electrodes 30a and 30b, the data lines 24, and the pixel potential layers 42a and 42b. The photosensitive acrylic resin sublayer 25b of the layer 25 thus formed is selectively exposed using a mask (not shown), developed, and sintered, thereby forming the contact holes 39a, 39b, and 39c.

The contact holes 39b, which are located above the source electrodes 30b placed near the said-stage gate electrodes 30c and which are used for the pixel electrodes 27, expose the lower $SiN_x$ sublayer 25a of the second interlayer dielectric layer 25. The contact holes 39c, which are located near the prior-stage gate electrodes 30c and which are used for the pixel electrodes 27, expose the lower $SiN_x$ sublayer 25a of the second interlayer dielectric layer 25. The contact holes 39a, which are located above the common electrode lines 26b and which are used for the same lines 26b, expose the lower $SiN_x$ sublayer 25a of the second interlayer dielectric layer 25.

Following this process step, by way of the contact holes 39b and 39c for the pixel electrodes 27 and the contact holes 39a for the common electrode lines 26a and 26b, the exposed $SiN_x$ sublayer 25a of the second interlayer dielectric layer 25 is selectively etched. Further, the underlying first interlayer dielectric layer 23 is selectively etched by way of the holes 39a. Thus, the holes 39b expose the source electrodes 30b, the holes 39c expose the pixel potential layers 42a or 42b, and the holes 39a expose the common electrode lines 26a or 26b.

Subsequently, the ITO layer 46 is deposited over the whole glass plate 22 to cover the contact holes 39a, 39b, and 39c. Thus, the inner faces of these holes 39a, 39b, and 39c are covered with the ITO layer 46. The ITO layer 46 is then patterned by photolithography and etching methods, thereby forming the pixel electrodes 27 for the respective pixels. Thereafter, the fourth dielectric layer 47 made of photosensitive acrylic resin (i.e., organic material) is deposited to cover the pixel electrodes 27. The layer 47 is thicker than the $SiN_x$ sublayer 25b of the second interlayer dielectric layer 25 and is thinner than the photosensitive acrylic resin sublayer 25b thereof. Then, the photosensitive acrylic resin layer 47 is selectively exposed using a mask (not shown), developed, and sintered, thereby making the contact holes 39a reach the common electrode lines 26b.

Moreover, an ITO layer (not shown) is deposited on the fourth interlayer dielectric layer 47 over the whole glass plate 22, thereby covering the contact holes 39a, 39b, and 39c. The ITO layer thus deposited is then patterned by photolithography and etching methods, thereby forming the common electrode 26 for each pixel. In this way, the active element substrate 11 is completed.

In this substrate 11 thus completed, the first storage capacitor using the pixel potential layer 42a is provided near the said-stage gate electrode 30c and at the same time, the second storage capacitor using the pixel potential layer 42b is provided near the prior-stage gate electrode 30c in each pixel. The pixel potential layer 42a is electrically connected to the pixel potential layer 42b by way of the transparent pixel electrode 27 and thus, the first and second storage capacitors are electrically connected in parallel to each other.

In the same way as the first embodiment, the active element substrate 11 and the opposite substrate 12 thus fabricated are then coupled to each other in such a way as to form the liquid crystal layer 13 including a nematic liquid crystal, resulting in the LCD panel.

The inventors actually fabricated the LCD device 4 according to the fourth embodiment in the same way as explained above. Thereafter, the intensity of light penetrating through the liquid crystal layer 13 (i.e., the LCD panel) was controlled by changing the alignment state of the liquid crystal molecules existing in the layer 13 with the external signal voltages, thereby displaying images in gray scales in the "normally black display mode". Thereafter, the LCD device 4 thus fabricated was built in a driver unit and operated with the use of the unit. As a result, it was confirmed that the LCD device 4 of the fourth embodiment operated as an IPS-type LCD device with a higher transmittance than the prior-art LCD devices.

With the LCD device 4 of the fourth embodiment, the common electrodes 26 are formed by a different conductive layer from that for the pixel electrodes 27 and located in different levels by way of the fourth interlayer dielectric layer 47. Therefore, the fabrication cost rises slightly compared with the case where the electrodes 27 and 26 are formed by the same conductive layer. Instead, there is an additional advantage that the margin for designing the electrodes is expanded and as a result, the transmittance is further improved.

If the common electrode 26 is located in a different level from that of the pixel electrodes 27 like in the fourth embodiment, it is preferred that the common electrode 26 is located nearer to the liquid crystal layer 13 than the pixel electrodes 27 from the viewpoint of the display stability and reliability of the LCD device.

Fifth Embodiment

Figure 18:
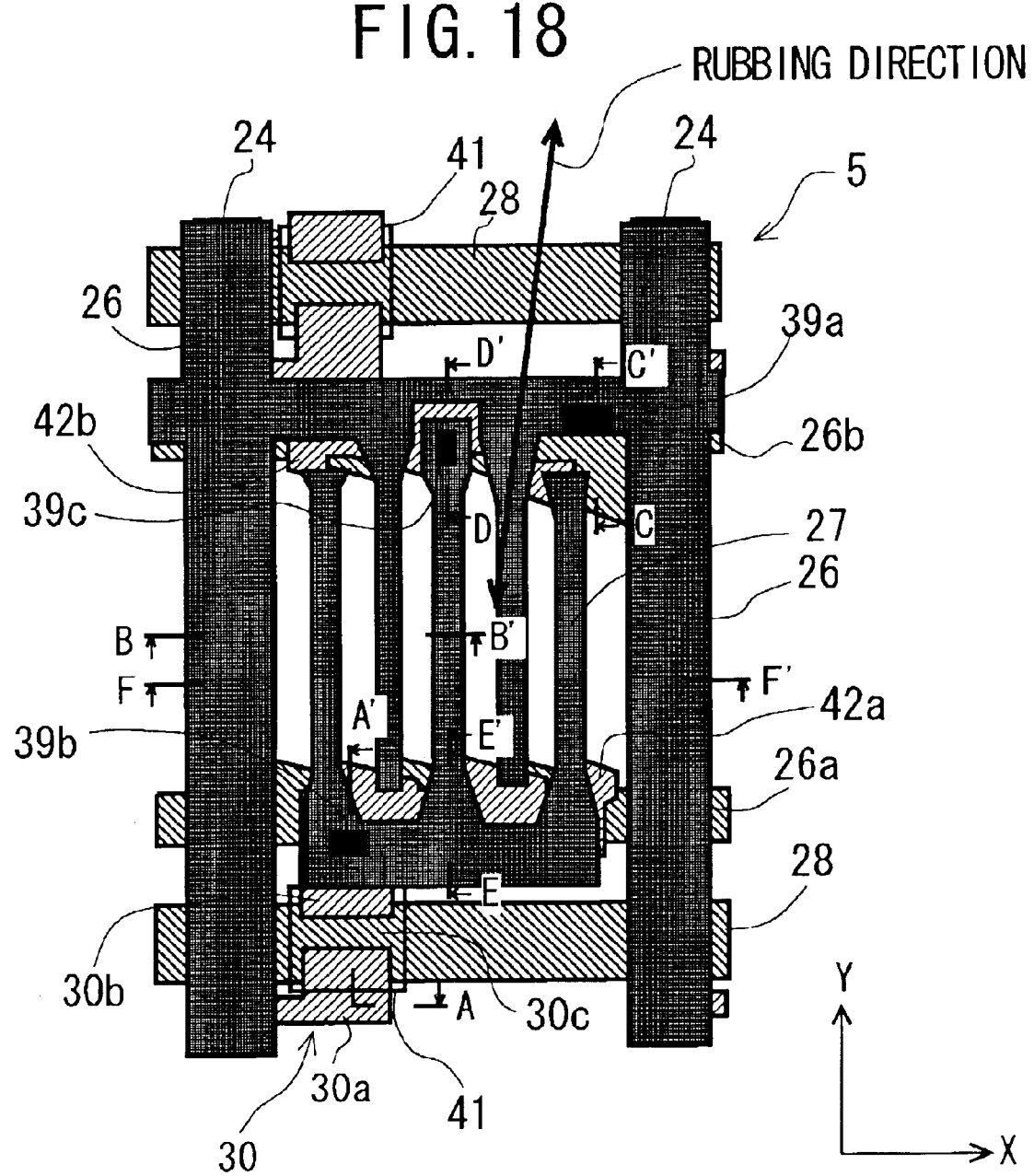
FIG. 18 is a schematic plan view showing the layout of the active element substrate of an IPS mode active-matrix addressing LCD device according to a fifth embodiment of the invention.
Figure 19:
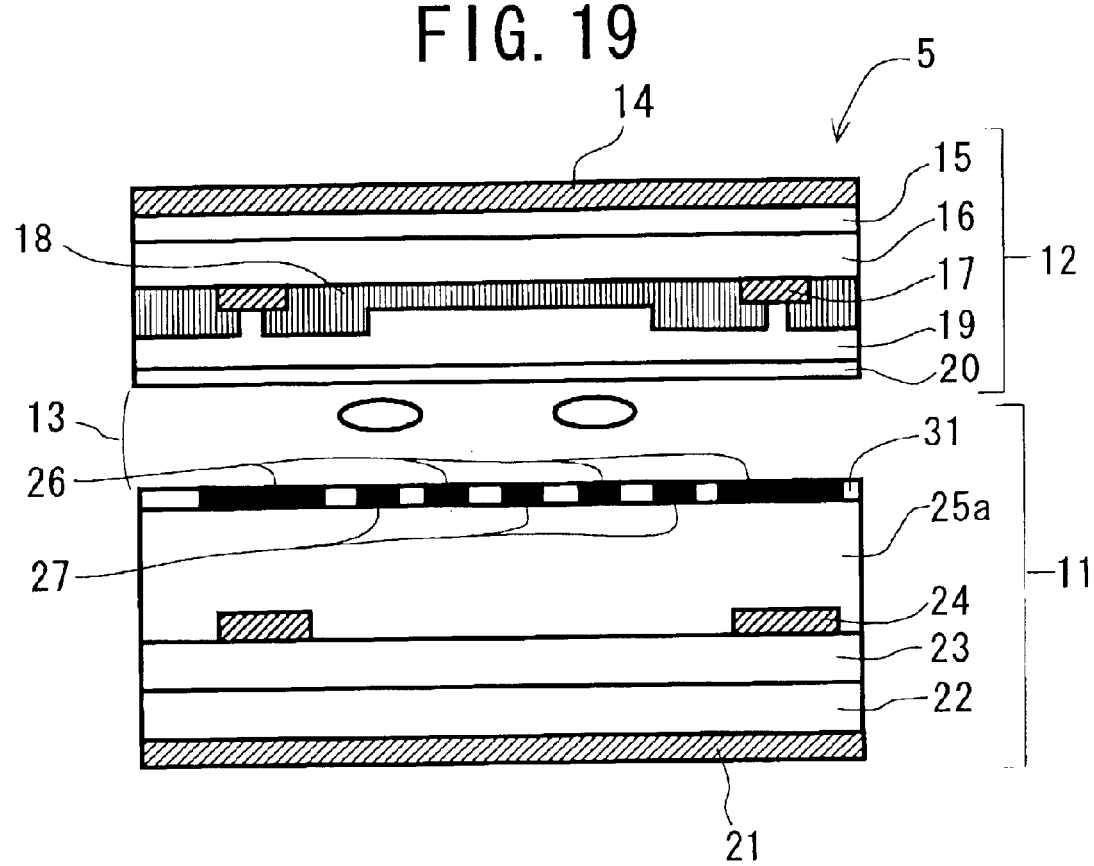
FIG. 19 is a partial, schematic cross-sectional view along the line F–F' in FIG. 18.

FIGS. 18 and 19 show an IPS mode active-matrix addressing LCD device 5 according to a fifth embodiment of the invention.

FIG. 18 shows a plan view of the active element substrate. FIG. 19 shows the cross-sectional view along the line F–F' in FIG. 18. In these figures, the same reference numerals or symbols are attached to the same elements as shown in the LCD device 1 according to the above-described first embodiment. Thus, the explanation about the same elements is omitted here for the sake of simplification of description.

Comparing the device 5 of the fifth embodiment with that of the first embodiment, the configuration of the fifth embodiment is the same as that of the first embodiment with respect to the active element substrate 11, except for the structure of the second interlayer dielectric layer 25.

Specifically, with the LCD device 5 of the fifth embodiment, the second interlayer dielectric layer 25, which is placed between the data lines 24 and the common electrodes 26, is formed by a single inorganic layer, i.e., the $SiN_x$ layer 25a. The opposite substrate 12 is the same in configuration as the first and second embodiments.

Next, a method of fabricating the LCD device of the fifth embodiment is explained below.

In the method of the LCD device 5 of the fifth embodiment, first, the same process steps as show in FIG. 5A to FIG. 6C in the first embodiment are carried out, except for the process step of forming the second interlayer dielectric layer 25 shown in FIG. 6A. In the process step of forming the layer 25, unlike the first embodiment, only the $SiN_x$ layer 25a is deposited as the second interlayer dielectric layer to cover the source and drain electrodes 30a and 30b, the data lines 24, and the pixel potential layers 42a and 42b over the whole glass plate 22.

Thereafter, like the first embodiment, the $SiN_x$ layer 25a thus formed is selectively etched, forming the contact holes 39a, 39b, and 39c. The contact holes 39b, which are located above the source electrodes 30b placed near the said-stage gate electrodes 30c and which are used for the pixel electrodes 27, expose the $SiN_x$ first interlayer dielectric 23. The contact holes 39c, which are located near the prior-stage gate electrodes 30c and which are used for the pixel electrodes 27. The contact holes 39a, which are located above the common electrode lines 26b and which are used for the same lines 26b. By way of the contact holes 39a, the underlying first interlayer dielectric layer 23 is selectively etched by way of the holes 39a. Thus, the holes 39b expose the source electrodes 30b, the holes 39c expose the pixel potential layers 42a or 42b, and the holes 39a expose the common electrode lines 26a or 26b.

Subsequently, through the same process steps as those in the first embodiment, the active element substrate 11 of the fifth embodiment is fabricated. In this substrate 11 thus completed, the first storage capacitor using the pixel potential layer 42a is provided near the said-stage gate electrode 30c and at the same time, the second storage capacitor using the pixel potential layer 42b is provided near the prior-stage gate electrode 30c in each pixel. The pixel potential layer 42a is electrically connected to the pixel potential layer 42b by way of the transparent pixel electrode 27 and thus, the first and second storage capacitors are electrically connected in parallel to each other.

In the same way as the first embodiment, the active element substrate 11 and the opposite substrate 12 thus fabricated are then coupled to each other in such a way as to form the liquid crystal layer 13 including a nematic liquid crystal, resulting in the LCD panel.

The inventors actually fabricated the LCD device 5 according to the fifth embodiment in the same way as explained above. Thereafter, the intensity of light penetrating through the liquid crystal layer 13 (i.e., the LCD panel) was controlled by changing the alignment state of the liquid crystal molecules existing in the layer 13 with the external signal voltages, thereby displaying images in gray scales in the "normally black display mode". Thereafter, the LCD device 5 thus fabricated was built in a driver unit and operated with the use of the unit: As a result, it was confirmed that the LCD device 5 of the fifth embodiment operated as an IPS mode LCD device with a higher transmittance than the prior-art LCD devices.

Sixth Embodiment

Figure 20:
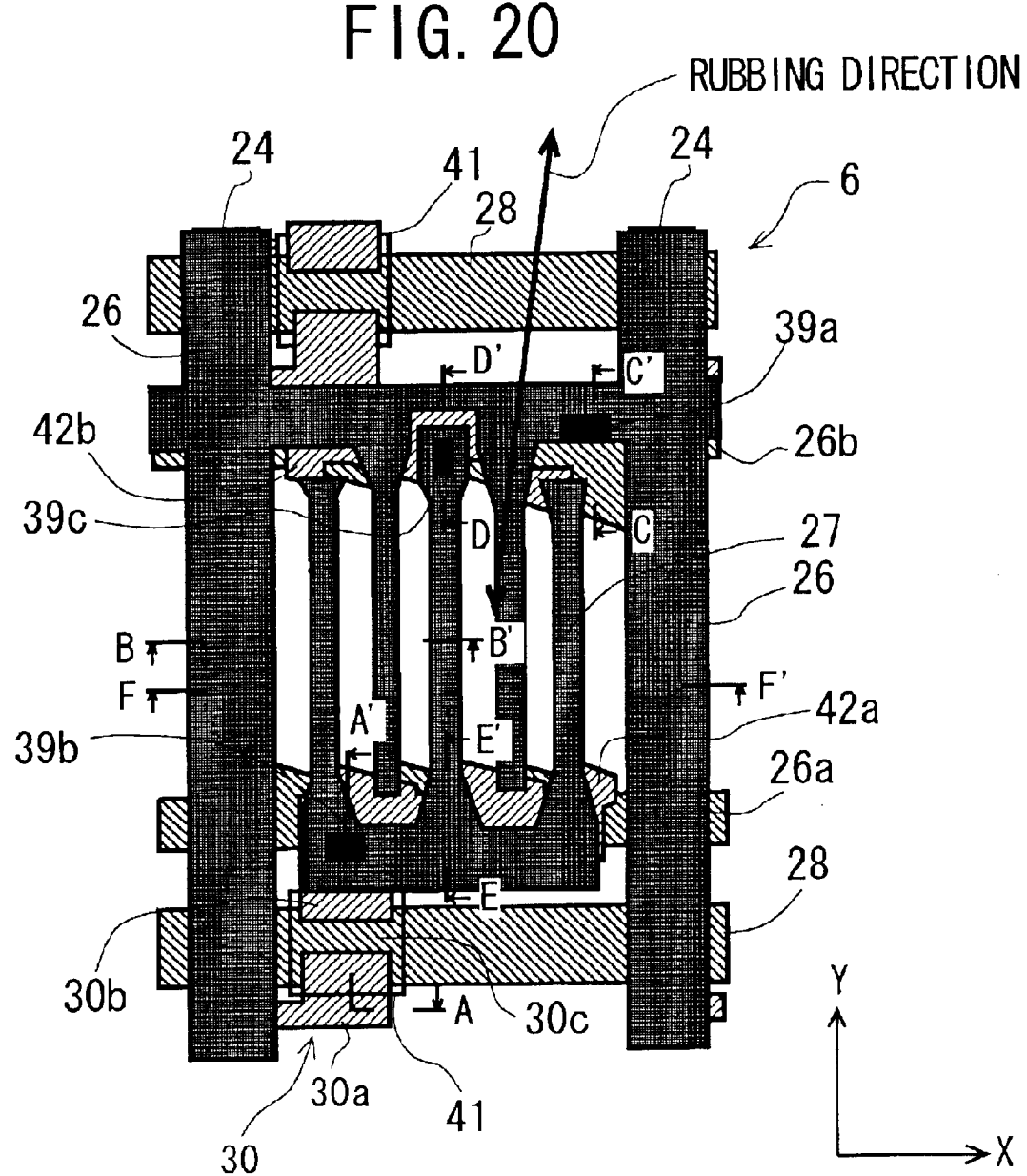
FIG. 20 is a schematic plan view showing the layout of the active element substrate of an IPS mode active-matrix addressing LCD device according to a sixth embodiment of the invention.
Figure 21:
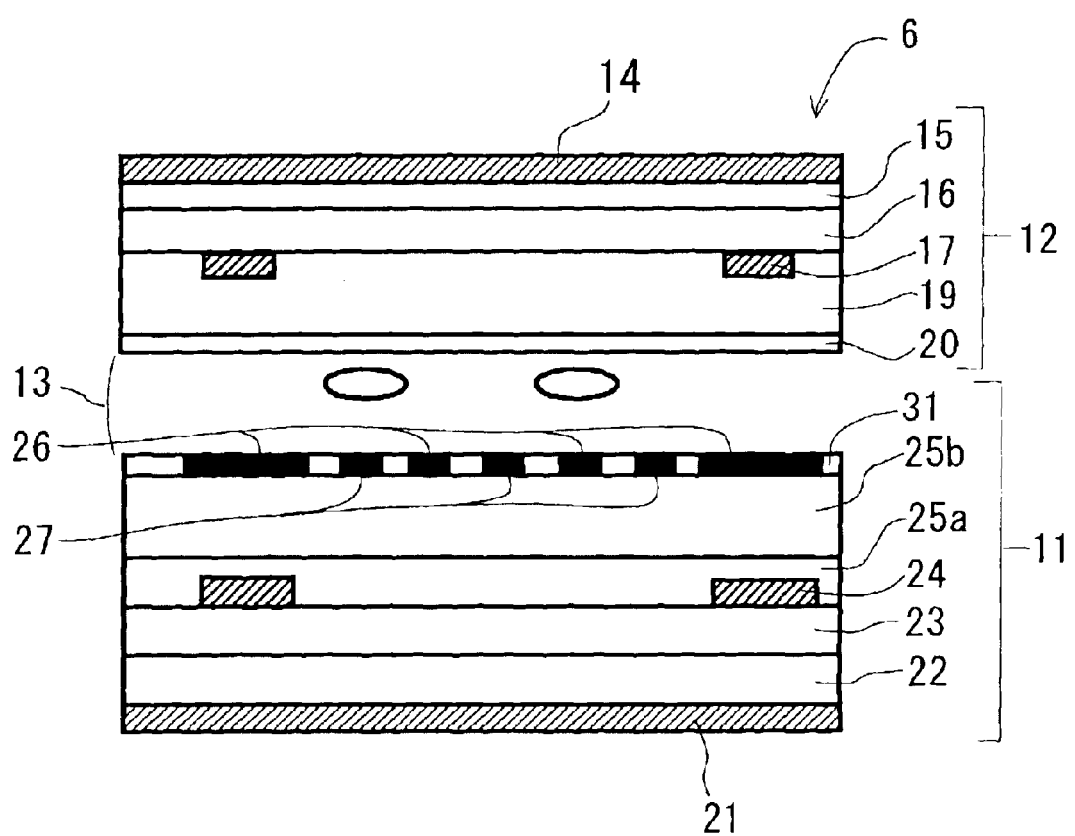
FIG. 21 is a partial, schematic cross-sectional view along the line F–F' in FIG. 20.
Figure 22:
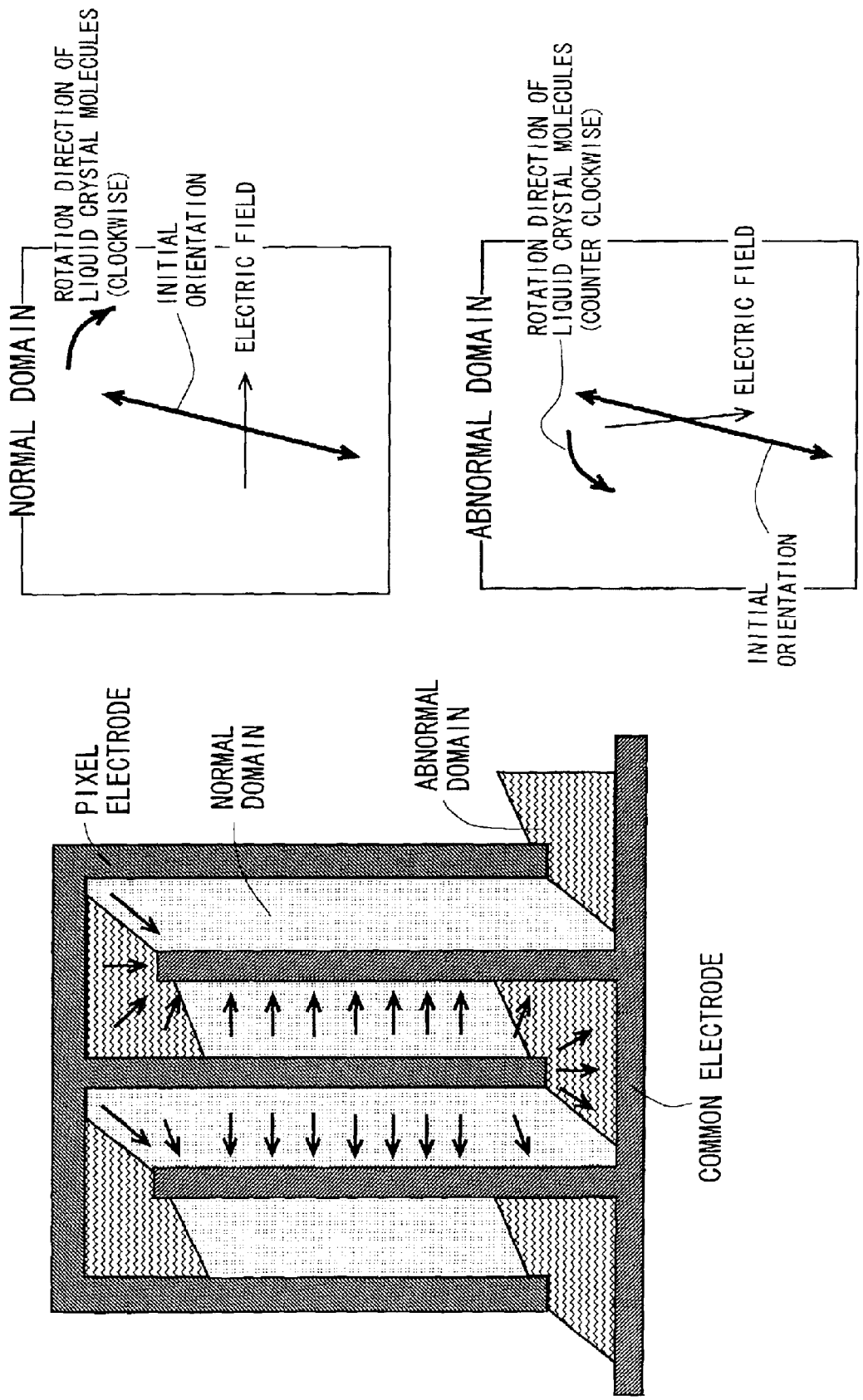
FIG. 22 is a schematic plan view explaining the states of the electric field in the normal and abnormal domains formed in a typical IPS mode active-matrix addressing LCD device.

FIGS. 20 and 21 show an IPS mode active-matrix addressing LCD device 6 according to a sixth embodiment of the invention.

FIG. 20 shows a plan view of the active element substrate. FIG. 21 shows the cross-sectional view along the line F–F' in FIG. 20. In these figures, the same reference numerals or symbols are attached to the same elements as shown in the LCD device 1 according to the above-described first embodiment. Thus, the explanation about the same elements is omitted here for the sake of simplification of description.

Comparing the device 6 of the sixth embodiment with that of the first embodiment, the configuration of the sixth embodiment is the same as that of the first embodiment, except for the color layer 12 is omitted from the opposite substrate 12.

Specifically, with the LCD device 6 of the sixth embodiment, the light-shielding layer or black matrix 17 is selectively formed on the inner surface of the glass plate 16 to cover the desired areas, and the overcoat or planarization layer 19 is selectively formed to cover the black matrix 17. On the outer surface of the plate 16, the transparent, conductive layer (e.g., an ITO layer) 15 is formed by the sputtering method. This is to prevent unevenness in displayed images due to charge-up caused by hand-touch of the user to the LCD panel. The active element substrate 11 is the same in configuration as that of the first embodiment.

In the same way as the first embodiment, the active element substrate 11 and the opposite substrate 12 thus fabricated are then coupled to each other in such a way as to form the liquid crystal layer 13 including a nematic liquid crystal, resulting in the LCD panel.

The inventors actually fabricated the LCD device 6 according to the sixth embodiment in the same way as explained above. Thereafter, the intensity of light penetrating through the liquid crystal layer 13 (i.e., the LCD panel) was controlled by changing the alignment state of the liquid crystal molecules existing in the layer 13 with the external signal voltages, thereby displaying images in gray scales in the "normally black display mode". Thereafter, the LCD device 6 thus fabricated was built in a driver unit and operated with the use of the unit. As a result, it was confirmed that the LCD device 6 of the sixth embodiment operated as an IPS-type LCD device with a higher transmittance than the prior-art LCD devices.

Variations

Needless to say, the present invention is not limited to the above-described first to sixth embodiments, because they are preferred examples of the invention. Any change or modification may be added to them within the spirit of the invention.

For example, the common electrode 26 and the pixel electrodes 27 are made of ITO as a transparent, conductive material in the above-described embodiments. This is to ensure high-level reliability. However, they may be made of IZO (Indium Zinc Oxide) or other similar material. This is because similar effects or advantages to the use of ITO are obtainable.

Moreover, in the above-described first to sixth embodiments, the common and pixel electrodes, which serve as the driving electrodes for the liquid crystal, have a comb-teeth like shape (i.e., a row of "linear" teeth or sticks). However, the invention is not limited to this. The invention is applicable to the so-called multi-domain structure, where the driving electrodes are not linear but corrugated or ribbed. In this case, the same advantage as the projected common electrode is obtainable, which provides a further advantage that the viewing angle is further expanded.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. An active-matrix addressing LCD device comprising:

an active element substrate;

an opposite substrate coupled with the active element substrate;

a liquid crystal layer formed between the active element substrate and the opposite substrate;

pixel electrodes formed on the active element substrate to form pixels arranged in a matrix array;

a common electrode formed on the active element substrate to be commonly used for all the pixels;

switching elements formed on the active element substrate, which are used for the respective pixels;

scanning lines formed on the active element substrate, through which scanning signals are transmitted to the elements;

data lines formed on the active element substrate, through which data signals are transmitted to the elements;

common electrode lines formed on the active element substrate, through which a fixed potential are applied to the common electrode;

wherein each of the pixels comprises two of the common electrode lines;

patterned pixel potential layers formed on the active element substrate to be overlapped with the common electrode lines by way of an intervening dielectric layer;

wherein each of the pixels comprises two of the pixel potential layers;

wherein a first storage capacitor for each of the pixels comprises a first one of the common electrode lines, a first one of the pixel potential layers, and the intervening dielectric layer;

wherein a second storage capacitor for the same pixel comprises a second one of the common electrode lines, a second one of the pixel potential layers, and the intervening dielectric layer;

wherein the first one of the pixel potential layers and the second one of the pixel potential layers are electrically connected to each other by a corresponding one of the pixel electrodes; and wherein the first storage capacitor is located near a corresponding one of the scanning lines and the second storage capacitor is located near an adjoining one of the scanning lines in said pixel.

2. The device according to claim 1, further comprising a single interlayer dielectric layer including inorganic material provided between the data lines and the common electrode.

3. The device according to claim 1, further comprising a color layer provided on the opposite substrate.

4. The device according to claim 1, wherein the opposite substrate is devoid of a color layer provided thereon.

5. The device according to claim 1, wherein the first and second pixel potential layers for each of the pixels are arranged to be apart from each other in a direction substantially parallel to the data lines, and wherein each of the first and second pixel potential layers is electrically connected to the corresponding one of the pixel electrodes by a contact hole.

6. The device according to claim 1, wherein the common electrode and the pixel electrodes are transparent and located in a level nearer to the liquid crystal layer than the data lines;

wherein the data lines are entirely covered with the common electrode by a dielectric layer except for vicinities of the scanning lines;

wherein the common electrode is electrically connected to the common electrode lines by corresponding contact holes for the respective pixels;

wherein a black matrix is formed on the opposite substrate to have a width less than a width of the common electrode in areas where the data lines are entirely covered with the common electrode; and wherein no light-shielding layer is formed between the common electrode entirely covering the data lines and an adjoining one of the pixel electrodes thereto.

7. The device according to claim 6, wherein the pixel electrodes and the common electrode are formed in a same level.

8. The device according to claim 6, wherein the pixel electrodes and the common electrode are formed in different levels by way of a dielectric layer.

9. The device according to claim 8, wherein the common electrode faces the liquid crystal layer by way of an alignment layer.

10. The device according to claim 1, wherein the common electrode comprises a same conductive material as that of terminals used for applying electrical signal to at least one of the scanning lines, the data lines, and the common electrode lines; and wherein the common electrode is formed in a same process as that of the terminals.

11. The device according to claim 10, wherein the pixel electrodes and the common electrode are formed to be wider than the common electrode lines and the data lines in overlapped areas of the pixel electrodes and the common electrode with the common electrode lines and the data lines.

12. The device according to claim 1, wherein the pixel electrodes and the common electrode comprise at least one of ITO (Indium Tin Oxide) and IZO (Indium Zinc Oxide).

13. The active-matrix addressing LCD device according to claim 1, wherein the first one of the pixel potential layers and the second one of the pixel potential layers are disposed in a same plane; and wherein the corresponding one of the pixel electrodes is disposed in a different plane than said same plane.

14. An active-matrix addressing LCD device comprising:

an active element substrate;

an opposite substrate coupled with the active element substrate;

a liquid crystal layer formed between the active element substrate and the opposite substrate;

pixel electrodes formed on the active element substrate to form pixels arranged in a matrix array;

a common electrode formed on the active element substrate to be commonly used for all the pixels;

switching elements formed on the active element substrate, which are used for the respective pixels;

scanning lines formed on the active element substrate, through which scanning signals are transmitted to the elements;

data lines formed on the active element substrate, through which data signals are transmitted to the elements;

common electrode lines formed on the active element substrate, through which a fixed potential are applied to the common electrode;

wherein each of the pixels comprises two of the common electrode lines;

patterned pixel potential layers formed on the active element substrate to be overlapped with the common electrode lines by an intervening dielectric layer;

wherein each of the pixels comprises two of the pixel potential layers;

wherein a first storage capacitor for each of the pixels comprises a first one of the common electrode lines, a first one of the pixel potential layers, and the intervening dielectric layer;

wherein a second storage capacitor for the same pixel comprises a second one of the common electrode lines, a second one of the pixel potential layers, and the intervening dielectric layer;

wherein the first one of the pixel potential layers and the second one of the pixel potential layers are electrically connected to each other by an interconnection electrode formed on the active element substrate to be apart from the liquid crystal layer at a largest distance; and wherein the first storage capacitor is located near a corresponding one of the scanning lines and the second storage capacitor is located near an adjoining one of the scanning lines in said pixel.

15. The device according to claim 14, wherein the interconnection electrodes are located in a same level as the common electrode lines and the scanning lines.

16. The device according to claim 14, wherein the common electrode lines are located in a different level from that of the scanning lines; and wherein the interconnection electrodes are located in a same level as the common electrode lines.

17. The device according to claim 14, wherein the first and second pixel potential layers for each of the pixels are arranged to be apart from each other in a direction substantially parallel to the data lines;

and wherein each of the first and second pixel potential layers is electrically connected to the corresponding one of the pixel electrodes by a contact hole.

18. The device according to claim 14, wherein the common electrode and the pixel electrodes are transparent and located in a level nearer to the liquid crystal layer than the data lines;

wherein the data lines are entirely covered with the common electrode by a dielectric layer except for vicinities of the scanning lines;

wherein the common electrode is electrically connected to the common electrode lines by corresponding contact holes for the respective pixels;

wherein a black matrix is formed on the opposite substrate to have a width less than a width of the common electrode in areas where the data lines are entirely covered with the common electrode; and wherein no light-shielding layer is formed between the common electrode entirely covering the data lines and an adjoining one of the pixel electrodes thereto.

19. The device according to claim 18, wherein the pixel electrodes and the common electrode are formed in a same level.

20. The device according to claim 18, wherein the pixel electrodes and the common electrode are formed in different levels by way of a dielectric layer.

21. The device according to claim 20, wherein the common electrode faces the liquid crystal layer by way of an alignment layer.

22. The device according to claim 14,
wherein the common electrode comprises a same conductive material as that of terminals used for applying electrical signal to at least one of the scanning lines, the data lines, and the common electrode lines; and
wherein the common electrode is formed in a same process as that of the terminals.

23. The device according to claim 22, wherein the pixel electrodes and the common electrode are formed to be wider than the common electrode lines and the data lines in overlapped areas of the pixel electrodes and the common electrode with the common electrode lines and the data lines.

24. The device according to claim 14, wherein the pixel electrodes and the common electrode comprises at least one of ITO (Indium Tin Oxide) and IZO (Indium Zinc Oxide).

25. An active-matrix addressing LCD device comprising:
at least two substrates;
a liquid crystal layer disposed between the at least two substrates;
a plurality of pixel electrodes formed on at least one substrate to form pixels;
common electrode lines formed on the at least one substrate; and
patterned pixel potential layers formed on the at least one substrate;
wherein each of the pixels comprises at least two of the common electrode lines;
wherein each of the pixels comprises at least two of the pixel potential layers; and
wherein the first one of the pixel potential layers is electrically connected to the second one of the pixel potential layers by an interconnection electrode formed on the at least one substrate at a largest distance apart from the liquid crystal layer.

26. The active-matrix addressing LCD device according to claim 25, further comprising:
switching elements formed on the at least one substrate;
scanning lines formed on the at least one substrate;
data lines formed on the at least one substrate;
wherein the patterned pixel potential layers overlap the common electrode lines by way of an intervening dielectric layer;
wherein a first storage capacitor for each of the pixels comprises a first one of the common electrode lines, a first one of the pixel potential layers, and the intervening dielectric layer; and
wherein a second storage capacitor for the same pixel comprises a second one of the common electrode lines, a second one of the pixel potential layers, and the intervening dielectric layer.

27. The active-matrix addressing LCD device according to claim 26,
wherein the first storage capacitor is located near a corresponding one of the scanning lines and the second storage capacitor is located near an adjoining one of the scanning lines in said pixel.

* * * * *